United States Patent
Kumawat

(10) Patent No.: US 11,640,491 B2
(45) Date of Patent: May 2, 2023

(54) AUTOMATIC FONT VALUE DISTRIBUTION FOR VARIABLE FONTS

(71) Applicant: Adobe Inc., San Jose, CA (US)

(72) Inventor: Nirmal Kumawat, Rajsamand (IN)

(73) Assignee: Adobe Inc., San Jose, CA (US)

( * ) Notice: Subject to any disclaimer, the term of this patent is extended or adjusted under 35 U.S.C. 154(b) by 113 days.

(21) Appl. No.: 17/174,978

(22) Filed: Feb. 12, 2021

(65) Prior Publication Data

US 2022/0261529 A1 Aug. 18, 2022

(51) Int. Cl.
| | | |
|---|---|---|
| G06F 40/106 | (2020.01) | |
| G06F 40/109 | (2020.01) | |
| G06F 3/04847 | (2022.01) | |
| G06F 3/0482 | (2013.01) | |

(52) U.S. Cl.
CPC .......... *G06F 40/109* (2020.01); *G06F 3/0482* (2013.01); *G06F 3/04847* (2013.01); *G06F 40/106* (2020.01)

(58) Field of Classification Search
CPC .. G06F 40/109; G06F 40/106; G06F 3/04847; G06F 3/0482
See application file for complete search history.

(56) References Cited

U.S. PATENT DOCUMENTS

| | | | | |
|---|---|---|---|---|
| 2013/0002722 | A1* | 1/2013 | Krimon | G09G 5/26 345/661 |
| 2013/0304604 | A1* | 11/2013 | Hoffman | G06Q 30/0621 705/26.5 |
| 2015/0347356 | A1* | 12/2015 | Beaver | G09G 5/26 345/472 |
| 2018/0253883 | A1* | 9/2018 | Shanbhag | G06F 40/109 |
| 2018/0297392 | A1* | 10/2018 | Caberwal | B43L 13/026 |

FOREIGN PATENT DOCUMENTS

WO WO 00/63848 * 10/2000 ............. G06T 15/70

OTHER PUBLICATIONS

"GPOS—Glyph Positioning Table", Microsoft Documentation [retrieved Mar. 24, 2021]. Retrieved from the Internet <https://docs.microsoft.com/en-us/typography/opentype/spec/gpos#gpos-table-and-opentype-fontvariations>., Nov. 15, 2020, 75 pages.
"GSUB—Glyph Substitution Table", Microsoft Documentation [retrieved Mar. 24, 2021]. Retrieved from the Internet <https://docs.microsoft.com/en-us/typography/opentype/spec/gsub#gsub-table-and-opentype-fontvariations>., Oct. 16, 2020, 43 pages.

(Continued)

*Primary Examiner* — Kyle R Stork
(74) *Attorney, Agent, or Firm* — FIG. 1 Patents

(57) ABSTRACT

An automatic font value distribution system receives input specifying parameters for a variable font allowing one or more characteristics of the variable font to change along a design axis. Examples of design axes include weight, width, slant, optical size, italic, and so forth. The parameters include, for example, an upper value limit for the design axis, a lower value limit for the design axis, and a distribution profile for the design axis. A collection of glyphs is received, and design axis values are applied to the glyphs in accordance with the distribution profile and distributed across the design axis between the upper and lower value limits. The collection of glyphs is displayed with the generated design axis values.

20 Claims, 15 Drawing Sheets

(56) References Cited

OTHER PUBLICATIONS

"Tag: 'rvrn'", Microsoft Documents [retrieved Mar. 24, 2021]. Retrieved from the Internet <https://docs.microsoft.eom/en-us/typography/opentype/spec/features_pt#tag-rvrn>., Oct. 26, 2020, 2 pages.

"Variable Fonts", wikipedia.org, Wikimedia Foundation, Inc. [Retrieved Mar. 24, 2021]. Retrieved from the Internet <https://en.wikipedia.org/wiki/Variable_font>., 3 pages.

"xAvgCharWidth, OS/2—OS/2 and Windows Metrics Table", OpenType spec, Microsoft Typography, Microsoft Docs [retrieved Apr. 6, 2021]. Retrieved from the Internet <https://docs.microsoft.com/en-us/typography/opentype/spec/os2#xavgcharwidth>., Oct. 8, 2020, 1 page.

* cited by examiner

502 →

Variable Width
Distribution in
Text Paragraph

504 →

Variable Width
Distribution in Text
Paragraph

506 →

I Love Typography

*Fig. 5*

602 — Variable Weight Distribution in each word of text paragraph

604 — Variable Weight Distribution in each word of text paragraph 606 — I Love Typography

Lorem ipsum dolor sit amet, consectetuer adipiscing elit, sed diam nonummy nibh euismod tincidunt ut laoreet dolore magna aliquam erat volutpat. Ut wisi enim ad minim veniam, quis nostrud exerci tation ullamcorper suscipit lobortis nisl ut aliquip ex ea commodo consequat. Duis autem vel eum iriure dolor in hendrerit in vulputate velit esse molestie consequat, vel illum dolore eu feugiat nulla facilisis at vero eros et accumsan et iusto odio dignissim qui blandit praesent luptatum zzril delenit augue duis dolore te feugait nulla facilisi. Lorem ipsum dolor sit amet, consectetuer adipiscing elit, sed diam nonummy nibh euismod tincidunt ut laoreet dolore magna aliquam erat volutpat. Ut wisi enim ad minim veniam, quis nostrud exerci tation ullamcorper suscipit lobortis nisl ut aliquip ex ea commodo consequat. Duis autem vel eum iriure dolor in hendreri in vulputate velit esse molestie consequat, vel illum dolore eu feugiat nulla facilisis at vero eros et accumsan et iusto odio dignissim qui blandit

Lorem ipsum dolor sit amet, consectetuer adipiscing elit, sed diam nonummy nibh euismod tincidunt ut laoreet dolore magna aliquam erat volutpat. Ut wisi enim ad minim veniam, quis nostrud exerci tation ullamcorper suscipit lobortis nisl ut aliquip ex ea commodo consequat. Duis autem vel eum iriure dolor in hendrerit in vulputate velit esse molestie consequat, vel illum dolore eu feugiat nulla facilisis at vero eros et accumsan et iusto odio dignissim qui blandit praesent luptatum zzril delenit augue duis dolore te feugait nulla facilisi. Lorem ipsum dolor sit amet, consectetuer adipiscing elit, sed diam nonummy nibh euismod tincidunt ut laoreet dolore magna aliquam erat volutpat. Ut wisi enim ad minim veniam, quis nostrud exerci tation ullamcorper suscipit lobortis nisl ut aliquip ex ea commodo consequat. Duis autem vel eum iriure dolor in hendrerit in vulputat velit esse molestie consequat, vel illum dolore eu feugiat nulla facilisis at vero eros et accumsan et iusto odio dignissim qui blandit praesent luptatum zzril delenit augue duis dolore te feugait nulla facilisi.

1004

Lorem ipsum dolor sit amet, consectetuer adipiscing elit, sed diam nonummy nibh euismod tincidunt ut laoreet dolore magna aliquam erat volutpat. Ut wisi enim ad minim veniam, quis nostrud exerci tation ullamcorper suscipit lobortis nisl ut aliquip ex ea commodo consequat. Duis autem vel eum iriure dolor in hendrerit in vulputate velit esse molestie consequat, vel illum dolore eu feugiat nulla facilisis at vero eros et accumsan et iusto odio dignissim qui blandit praesent luptatum zzril delenit augue duis dolore te feugait nulla facilisi. Lorem ipsum dolor sit amet, consectetuer adipiscing elit, sed diam nonummy nibh euismod tincidunt ut laoreet dolore magna aliquam erat volutpat. Ut wisi enim ad minim veniam, quis nostrud exerci tation ullamcorper suscipit lobortis nisl ut aliquip ex ea commodo consequat. Duis autem vel eum iriure dolor in hendrerit in vulputate velit esse molestie consequat, vel illum dolore eu feugiat nulla facilisis at vero eros et accumsan et iusto odio dignissim qui blandit praesent luptatum zzril delenit augue duis dolore te feugait nulla facilisi.

*Fig. 10*

AUTOMATIC FONT VALUE DISTRIBUTION FOR VARIABLE FONTS

BACKGROUND

As computer technology has advanced, applications have similarly advanced and provide increasingly powerful features. One such feature is variable fonts, which have the built-in capability to adjust font weight and font width parameters using a single font file. When displaying a set of characters using a variable font, the user manually sets these font weight or font width parameters for each character in the set of characters. While these variable fonts are beneficial, they are not without their problems. One such problem is individually manually setting the font weight or font width is a tedious process that tends to be error prone and leads to poor results. For example, changes in font width oftentimes result in the set of characters overflowing a desired character input area. These problems lead to user dissatisfaction and frustration with their computers.

SUMMARY

To mitigate the disadvantages of conventional variable font management systems, an automatic font value distribution system as implemented by a computing device is described to provide automatic font value distribution for variable fonts. The system displays a user interface prompting for user input specifying parameters for a variable font, which allows one or more characteristics of the variable font to change along a design axis. User input specifying the parameters for the variable font is received. These parameters include an upper value limit for the design axis, a lower value limit for the design axis, and a distribution profile indicating a manner in which design axis values are to change for the design axis. A collection of glyphs is received, and design axis values are automatically generated along the design axis for each glyph in the collection of glyphs in accordance with the distribution profile. These design axis values range between the lower value limit and the upper value limit for the design axis. The system displays each glyph in the collection of glyphs with a characteristic corresponding to the automatically generated design axis value for the glyph.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 5 illustrates examples of text generated by a horizontal axis distribution determination module.

FIG. 6 illustrates examples of text generated by a horizontal axis distribution determination module on a per-word basis.

FIG. 8 illustrates an example of text generated by a vertical axis distribution determination module.

FIG. 10 illustrates examples of text generated by a diagonal axis distribution determination module.

DETAILED DESCRIPTION

Overview

Figure 1:
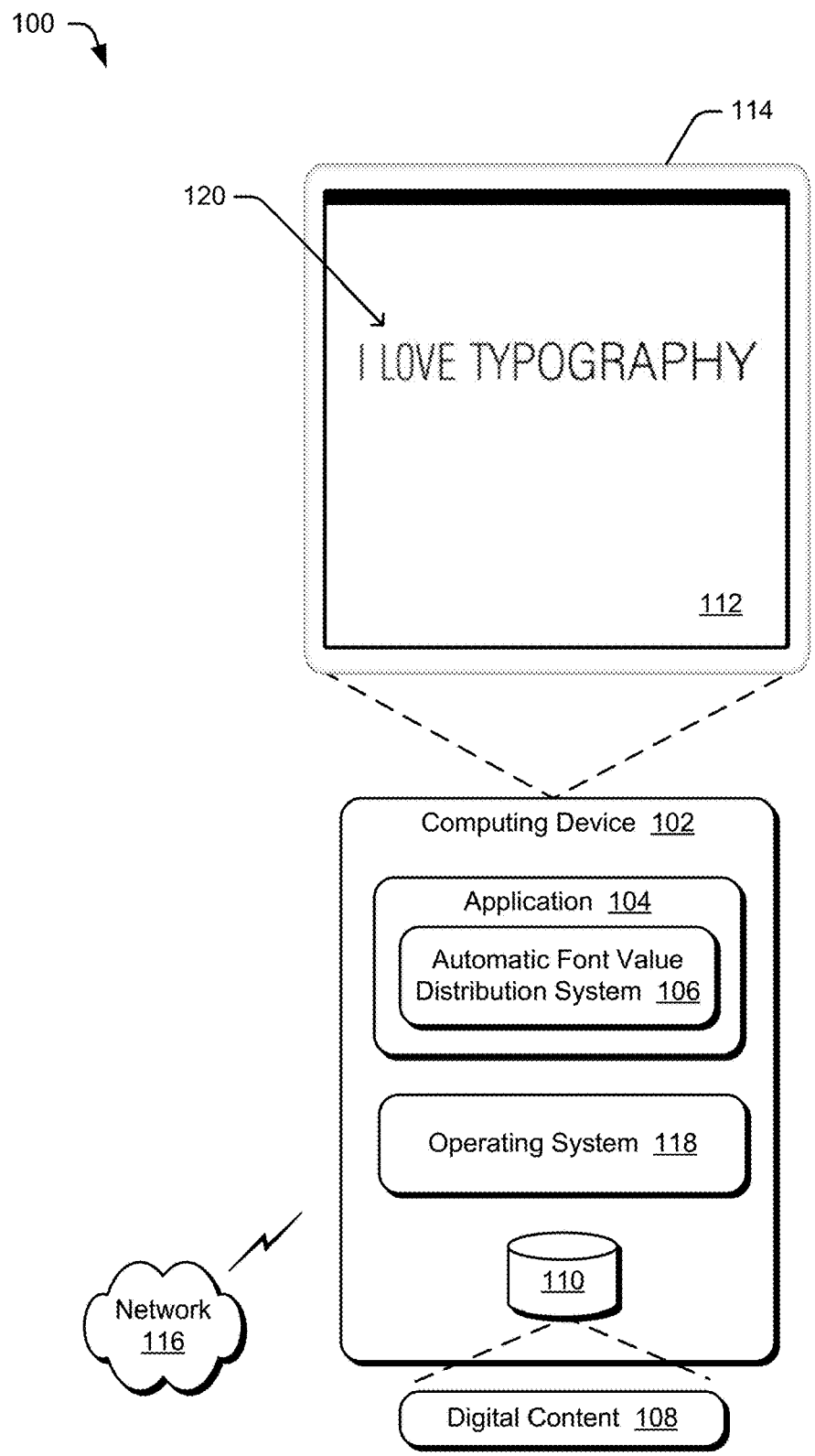
FIG. 1 is an illustration of a digital medium environment in an example implementation that is operable to employ the automatic font value distribution for variable fonts described herein.

Automatic font value distribution for variable fonts is discussed herein. Generally, an automatic font value distribution system receives input specifying parameters for a variable font allowing one or more characteristics of the variable font to change along a design axis. Examples of design axes include weight, width, slant, optical size, italic, and so forth. The parameters include, for example, an upper value limit for the design axis, a lower value limit for the design axis, and a distribution profile for the design axis. A collection of glyphs is received, and design axis values are applied to the glyphs in accordance with the distribution profile and distributed across the design axis between the upper and lower value limits. As an example, a distribution profile indicates increasing font width horizontally from left to right. Accordingly, the automatic font value distribution system generates design axis values that are automatically applied to the glyphs in a horizontal line of text starting with the lower value limit at the far left and ending with the upper value limit at the far right. The collection of glyphs is displayed with the generated design axis values.

More specifically, the automatic font value distribution system displays or otherwise presents a user interface and in response receives input that is a collection of glyphs (also referred to as text or characters) and variable font parameters for displaying the collection of glyphs. The variable font parameters identify various characteristics of the variable font, such as a design axis, range over which values for the design axis are to change (lower and upper value limits), a distribution profile indicating the manner in which values for the design axis are to change, whether the glyphs are input as area text or point text, and so forth. Each design axis refers to a different characteristic of the variable font, such as font weight, font width, font slant, font optical size, font italics, and so forth.

In one or more implementations, the automatic font value distribution system implements functionality to automatically generate values for glyphs along the horizontal axis and along each design axis indicated in the variable font parameters. A horizontal step value indicating the amount that the value along the design axis changes between each pair of glyphs (or between each word) is determined.

To generate the horizontal step value, the average number of characters in a text line is computed by dividing the text line width by the average glyph width (e.g., in pixels) for the variable font. The average glyph width for the variable font is determined in various manners, such as from a specification provided by a developer of the variable font. The horizontal step value is determined by computing the difference between the upper value limit and the lower value limit, and dividing the difference by the average number of glyphs (characters) in a text line.

Design axis values along the horizontal axis are determined by considering each glyph of a word in the glyph collection as a separate text object with a design axis value and constructing a text list including the text object of each glyph. For a given text line, the design axis value for each glyph is computed by adding (or subtracting) the horizontal step value to the previous glyph's design axis value. The updated width of each word with varying design axis on each glyph is computed and the width of a space glyph is added to the width of each word. Words are added to a text line until the text line reaches a limit (e.g., the text line width of the text box is met or exceeded), at which point the last glyph or whole word is moved to the start of the next text line.

Generating design axis values along the horizontal axis accounts for situations in which two adjacent glyphs have different kerning values (different amounts of space between glyphs) due to different design axis values being generated for the glyphs. In such situations the kerning values for the two glyphs are combined in some manner, such as averaged, to generate the kerning value. A modified glyph width for the selected glyph is generated by adding the width of the selected glyph (given the design axis value of the selected glyph) to the kerning value for the selected glyph.

Generating design axis values along the horizontal axis also accounts for situations in which one glyph is replaced with another, such as glyph substitutions or variations. For example, assume a variable font has a default glyph for the dollar sign with two vertical strokes running through the full extent of the glyph. In some situations (e.g., a bold or weight design axis value being greater than a threshold amount) the default glyph is substituted with an alternate (replacement) glyph that has only one vertical stroke to improve the appearance of the glyph. The situations in which the default glyph is to be substituted with the replacement glyph are specified in various manners, such as being default settings established by a developer or designer of the variable font, being user input identifying which glyphs of a variable font are to be replaced with which other glyphs and rules indicating when they are to be replaced, and so forth.

The design axis value for the replacement glyph remains the same as was used for the default (replaced) glyph. However, in some situations the width of the default glyph and the replacement glyph are different. In such situations, the width of the replacement glyph is used for further computation in displaying the glyph.

Additionally or alternatively, rather than generating design axis values distributed between the upper value limit and the lower value limit on a per-line basis, design axis values are distributed between the upper value limit and the lower value limit on a per-word basis. In such situations, a horizontal step value for each word is generated based on the number of glyphs in the word.

Additionally or alternatively, rather than generating design axis values distributed between the upper value limit and the lower value limit on a per-line basis, design axis values are distributed between the upper value limit and the lower with each glyph in the word having the same design axis value. The design axis values for the words in a text line vary in accordance with the distribution profile.

In one or more implementations, the automatic font value distribution system generates values for glyphs along the vertical axis and along each design axis indicated in the variable font parameters. The vertical axis distribution determination module determines a vertical step value indicating the amount that the value along the design axis changes between each line of text. The vertical step value is determined by computing the difference between the lower value limit for the design axis indicated in the variable font parameters and the upper value limit for the design axis indicated in the variable font parameters. This difference is divided by the target number of text lines. The target number of text lines refers to the number of text lines that are to be used to display the collection accounting for the different design axis values for the glyphs. The target number of text lines is determined in various manners such as averaging the number of text lines at the lower value limit and the number of text lines at the upper value limit for the design axis, searching (e.g., using a binary search) for a number of text lines that results in the last text line having the upper value limit or the lower value limit (depending on the distribution) and no text lines having the same design axis value.

For each text line, glyphs are added to the text line until the width of the text line is reached, then the design axis value is updated in accordance with the vertical step value. Accordingly, the glyphs in each line have the same design axis value, but the design axis values for different text lines differ.

Additionally or alternatively, the automatic font value distribution system generates values for glyphs along both the horizontal axis and the vertical axis (diagonally), as well as along each design axis indicated in the variable font parameters. Thus, the design axis values for glyphs in a text line vary in accordance with the distribution profile, and the beginning (or ending) design axis values for different text lines differ.

In one or more implementations, the distribution profile is a gradient. The gradient is identified in various manners, such as received as user input (e.g., a definition of the gradient specified by the user), received or copied from another device or system, and so forth. Accordingly, the distribution profile used by the automatic font value distribution system is user-definable.

In one or more implementations, the gradient is a color distribution between two values, such as 0 (e.g., representing black) and 1 (e.g., representing white). The values at locations along the gradient are mapped to corresponding glyph locations and used to determine the design axis value for the glyphs, resulting in a distribution of design axis values that corresponds to the gradient. This mapping is readily performed in various manners (e.g., based on the width or length of the gradient and the area in which text is entered, or based on the width or length of the gradient and the number of text lines to be displayed). The gradient is a color distribution in one or both of the vertical and horizontal directions, such as from left to right, from right to left, from top to bottom, from bottom to top, and so forth. The gradient takes one of various forms, such as an input image, a vector of stop-offsets and corresponding color values, and so forth.

The gradient includes multiple stop-offsets, including an initial stop-offset and a final stop-offset. The initial stop-offset indicates the beginning or starting of the gradient and the final stop-offset indicates the ending of the gradient. Furthermore, the gradient optionally includes one or more stop-offsets where the gradient changes (e.g., switches directions, such as switches from going white to black to going black to white). The gradient is able to include any number of stop-offsets in addition to the initial stop-offset and the final stop-offset.

The techniques discussed herein allow values for variable fonts along one or more design axes to be automatically generated based on user-specified parameters. This reduces the complexity of generating, as well as time taken, to apply different design axis values to text, such as by uniformly distributing the design axis values in accordance with any of various distribution profiles. Design axis values are generated quickly (e.g., within seconds), reducing the amount of energy used by a computing device. Additionally, the techniques allow design axis values to be automatically generated for complex situations including two or more different design axis values and large amounts of text, accounting for situations in which the value applied for one design axis value alters the layout of the text, thus affecting the values applied for another design axis value.

Term Descriptions

These term descriptions are provided for purposes of example only and are not intended to be construed as limiting on the scope of the claims.

The term "glyph" refers to a symbol within a set of symbols representing a human readable character. Examples of glyphs include symbols in the English alphabet, symbols in the Chinese alphabet, symbols in the Cyrillic alphabet, and so forth. The glyphs are displayable as text.

The term "variable font" refers to a single font having a range of various characteristics for glyphs. Examples of these characteristics include weights, widths, slants, optical size, italics, and so forth.

The term "design axis" refers to a particular characteristic of a variable font. Examples of a design axes include a design axis of weight, a design axis of width, a design axis of slant, a design axis of optical size, a design axis of italic, and so forth.

The term "distribution profile" refers to the manner in which values are assigned to or generated for characteristics of glyphs. Examples of distribution profiles include values increasing from left to right or from top to bottom, values decreasing from left to right or from top to bottom, values increasing or decreasing in accordance with a gradient, and so forth.

The term "horizontal axis" refers to one of two axes in a two-dimensional coordinate system in which glyphs are displayed. The horizontal axis is typically parallel to the plane of the horizon.

The term "vertical axis" refers to another of two axes in a two-dimensional coordinate system in which glyphs are displayed. The vertical axis is perpendicular to the horizontal axis.

In the following discussion, an example environment is first described that employs examples of techniques described herein. Example procedures are also described which are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the automatic font value distribution for variable fonts described herein. The illustrated environment 100 includes a computing device 102, implemented in any of a variety of ways. Examples of the computing device 102 include a mobile device (e.g., assuming a handheld configuration such as a tablet or mobile phone), a wearable device (e.g., augmented reality or virtual reality headsets, smartwatches), a laptop computer, a desktop computer, a game console, an automotive computer, and so forth. Thus, implementations of the computing device 102 range from full resource devices with substantial memory and processor resources (e.g., personal computers, game consoles) to a low-resource device with limited memory and/or processing resources (e.g., mobile devices). Additionally, although a single computing device 102 is shown, additionally or alternatively the computing device is representative of a plurality of different devices, such as multiple servers utilized by a business to perform operations "over the cloud" as described in FIG. 14.

The computing device 102 is illustrated as including an application 104 that includes an automatic font value distribution system 106. The application 104 processes and transforms digital content 108, which is illustrated as maintained in storage 110 of the computing device 102. Such processing includes creation of the digital content 108 and rendering of the digital content 108 in a user interface 112 for output, e.g., by a display device 114. Although illustrated as being displayed, additionally or alternatively the UI is presented in other manners (e.g., audibly, haptically). The storage 110 is any of a variety of different types of storage, such as random access memory (RAM), Flash memory, solid state drive, magnetic disk drive, and so forth. Although illustrated as implemented locally at the computing device 102, additionally or alternatively functionality of the application 104, including the automatic font value distribution system 106, is implemented in whole or part via functionality available via a network 116, such as part of a web service or "in the cloud."

The computing device 102 also includes an operating system 118 that implements functionality to manage execution of application 104 as well as other applications on the computing device 102, to operate as an interface between the application 104 and hardware of the computing device 102, and so forth. The operating system 118 performs some resource management in the computing device 102, such as scheduling processes of the application 104 for execution, allocating memory to the application 104, and so forth.

The automatic font value distribution system 106 implements functionality to generate values for glyphs along a design axis. The system 106 generates these values in accordance with a distribution profile, such as increasing from left to right, decreasing from top to bottom, and so forth. Text 120 is illustrated in user interface 112 using a variable font with values varying along a width design axis and a distribution profile increasing from left to right. As illustrated, the width of the glyphs in text 120 increases from left to right.

Although a single application 104 is illustrated in FIG. 1, any number of applications are includable in the computing device 102. Any additional applications included in the computing device 102 optionally include an automatic font value distribution system 106 generate values for glyphs along a design axis for that application.

In general, functionality, features, and concepts described in relation to the examples above and below are employable in the context of the example systems and procedures described herein. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combined in different ways. Thus, individual functionality, features, and concepts described in relation to different example environments, devices, components, figures, and procedures herein are usable in any suitable combinations and are not limited to the particular combinations represented by the enumerated examples in this description.

Automatic Font Value Distribution System Architecture and Operation

Figure 2:
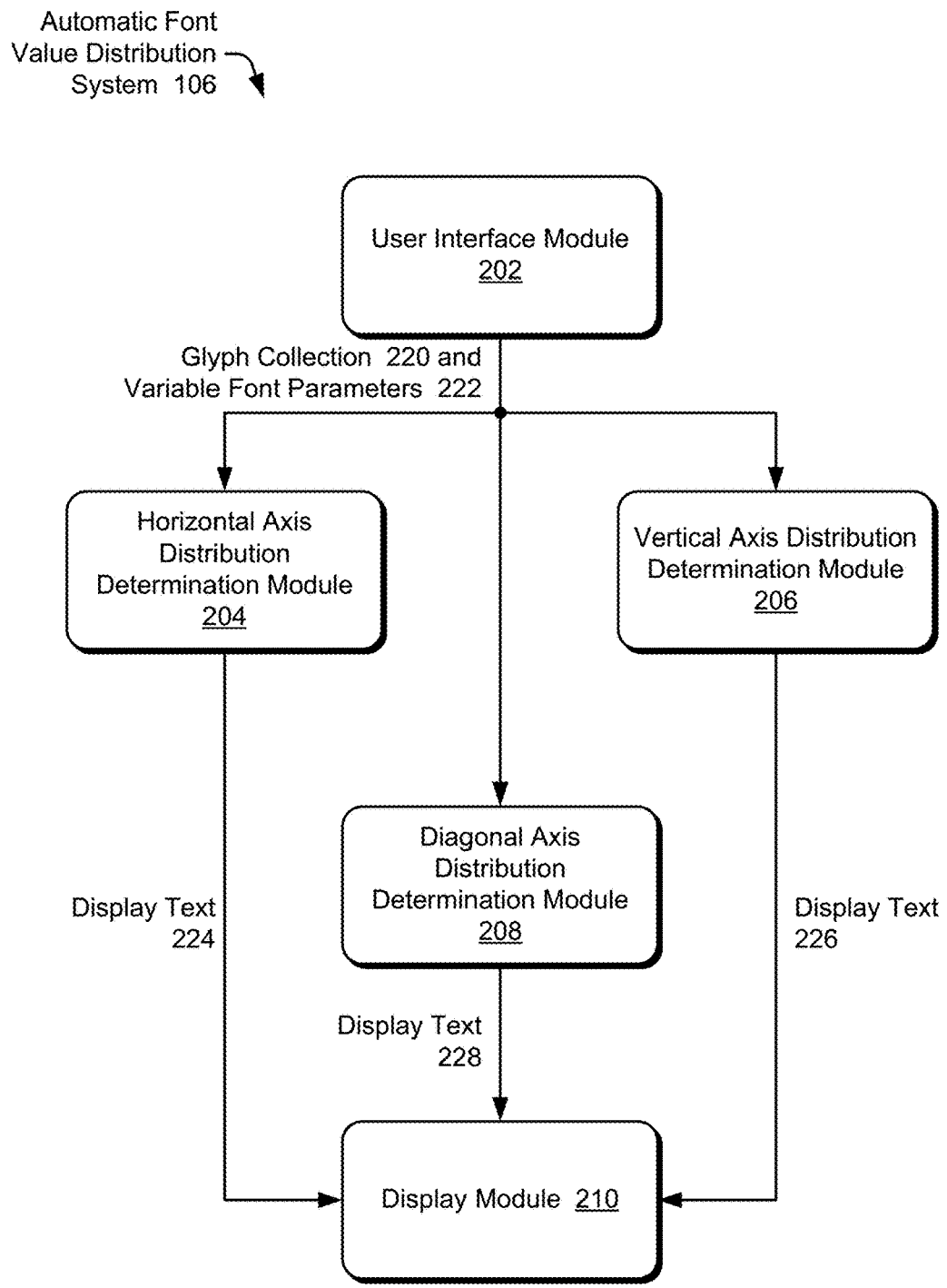
FIG. 2 is an illustration of an example architecture of an automatic font value distribution system.

FIG. 2 is an illustration of an example architecture of an automatic font value distribution system 106. The automatic font value distribution system 106 includes a user interface module 202, a horizontal axis distribution determination module 204, a vertical axis distribution determination module 206, a diagonal axis distribution determination module 208, and a diagonal axis distribution determination module 210.

Generally, the user interface module 202 receives input that is a collection of glyphs 220 (also referred to as text or characters) and variable font parameters 222 for displaying the collection of glyphs 220. The variable font parameters 222 identify various characteristics of the variable font, such as a design axis, range over which values for the design axis are to change, a distribution profile indicating the manner in which values for the design axis are to change, whether the glyphs are input as area text or point text, and so forth. Each design axis refers to a different characteristic of the variable font, such as font weight, font width, font slant, font optical size, font italics, and so forth.

The user interface module 202 provides the glyphs 220 and variable font parameters 222 to the appropriate one of the horizontal axis distribution determination module 204, the vertical axis distribution determination module 206, and the diagonal axis distribution determination module 208 based on the distribution profile indicated in the variable font parameters 222. The appropriate one of the horizontal axis distribution determination module 204, the vertical axis distribution determination module 206, and the diagonal axis distribution determination module 208 generates the display text in accordance with the variable font parameters 222.

Figure 3:
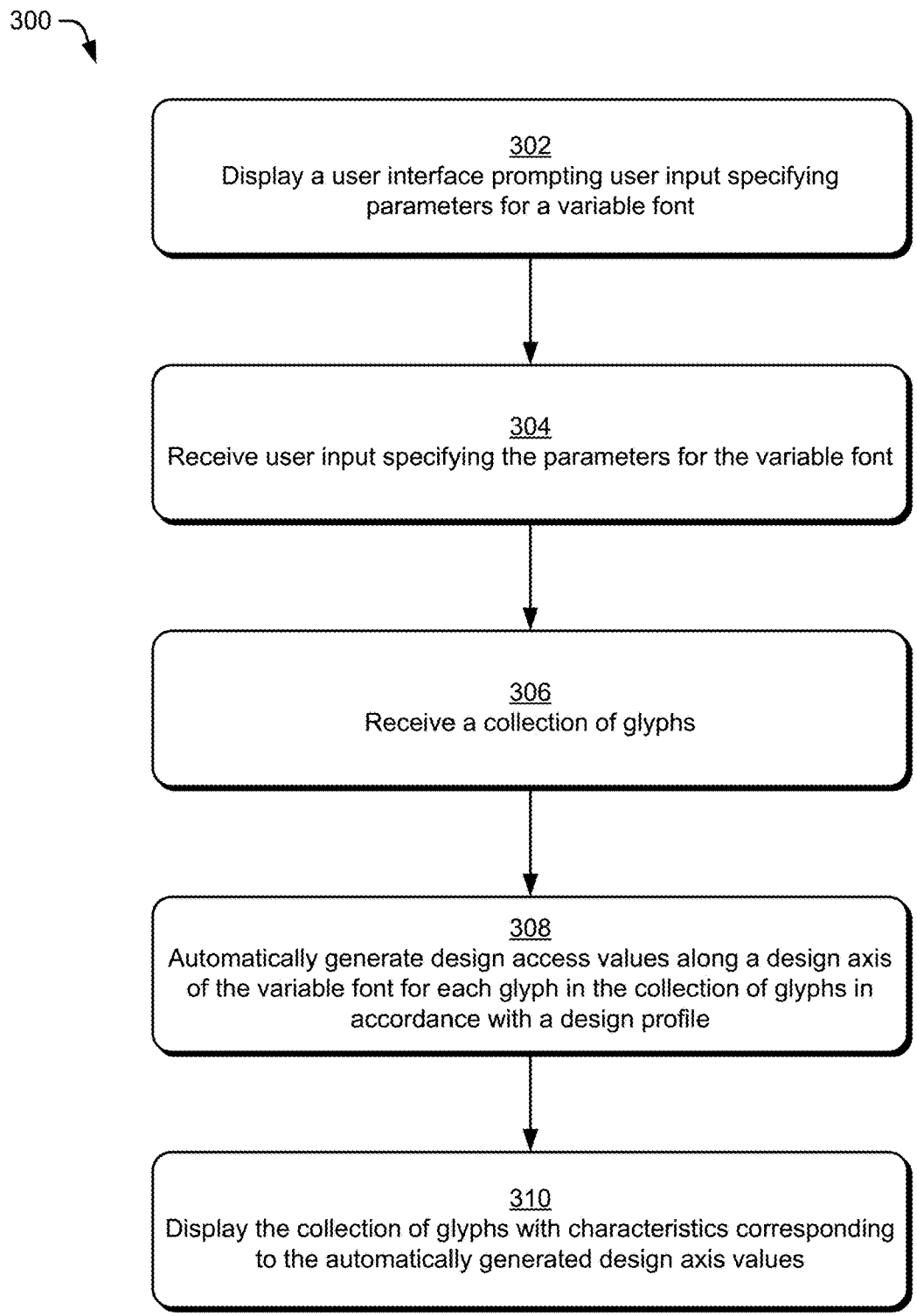
FIG. 3 is a flow diagram depicting a procedure in an example implementation of automatic font value distribution for variable fonts.

FIG. 3 is a flow diagram 300 depicting a procedure in an example implementation of automatic font value distribution for variable fonts. Aspects of the procedure are implemented in hardware, firmware, software, or a combination thereof. The procedure is shown as a set of blocks that specify operations performed by one or more devices and are not necessarily limited to the orders shown for performing the operations by the respective blocks.

In this example, a user interface prompting user input specifying parameters for a variable font is displayed (block 302). One or more characteristics of the variable font change along a design axis, such as font weight, font width, font slant, font optical size, font italics, and so forth.

User input specifying the parameters for the variable font is received (block 304). These parameters include, for example, an upper value limit for a design axis, a lower value limit for the design axis, and a distribution profile indicating the manner in which design axis values from glyph to glyph are to change for the design axis.

A collection of glyphs is received (block 306). The collection of glyphs is any grouping of glyphs and oftentimes is a set of words.

Design axis values are automatically generated along the design axis for each glyph in the collection of glyphs in accordance with the distribution profile (block 308). The design axis values range between the lower value limit and the upper value limit for the design axis.

Each glyph in the collection of glyphs is displayed with a characteristic corresponding to the automatically generated design axis value for the glyph (block 310).

Returning to FIG. 2, the user interface module 202 implements functionality to provide a user interface allowing a user of the client device to input glyphs and variable font parameters, which are provided to the appropriate one of horizontal axis distribution determination module 204, vertical axis distribution determination module 206, and diagonal axis distribution determination module 208 as glyphs 220 and variable font parameters 222. These variable font parameters are input in various manners, such as via a user interface displayed on the display device 114, via audible inputs, and so forth. Although discussed as being received as user inputs, additionally or alternatively the glyphs or variable font parameters 222 are received from another device or service rather than from user input at the client device 102.

In one or more embodiments, glyphs input to the user interface module 202 are point text or area text. Point text refers to text added at a particular (e.g., user selected) location in a document. Text is added in a single text line and no line breaks are present unless manually input by the user. Area text refers to text added to a particular (e.g., user selected) area, such as a rectangle, circle, or other shape, also referred to as a text box. As text is added, the text automatically wraps to the next text line as appropriate to avoid going beyond the horizontal edges of the area.

The variable font parameters indicate how glyphs are to be displayed for the variable font. The variable font parameters include one or more of a design axis, a lower value limit for the design axis, an upper value limit for the design axis, and a distribution profile for the design axis. Examples of upper and lower value limits include pre-defined upper and lower value limits, user-specified upper and lower value limits, and so forth. The variable font parameters optionally include a lower value limit, an upper value limit, and a distribution profile for multiple design axes.

The horizontal axis distribution determination module 204 implements functionality to automatically generate values for glyphs along the horizontal axis and along each design axis indicated in the variable font parameters 222. The horizontal axis distribution determination module 204 determines a horizontal step value indicating the amount that the value along the design axis changes between each pair of glyphs (or between each word as discussed in more detail below). In situations in which variable font parameters 222 indicate multiple design axes, the range of design axis values is oftentimes different for the different design axes, so a different horizontal step value is determined for each design axis.

In situations in which the glyphs are input as point text, the horizontal step value is determined by computing the difference between the upper value limit and the lower value limit, and dividing the difference by the number of glyphs in the collection 220.

In situations in which the glyphs are input as area text, the average number of characters in a text line is computed by dividing the text line width by the average glyph width (e.g., in pixels) for the variable font. The average glyph width for the variable font is determined in various manners, such as from a specification provided by a developer of the variable font. The horizontal step value is determined by computing the difference between the upper value limit and the lower value limit, and dividing the difference by the average number of glyphs (characters) in a text line.

Generally, the horizontal axis distribution determination module 204 considers each glyph of a word in the glyph collection as a separate text object with a design axis value and constructs a text list including the text object of each glyph. The design axis value for each glyph is computed by adding the horizontal step value to the previous glyph's design axis value. The updated width of each word with varying design axis on each glyph is computed and the width of a space glyph is added to the width of each word. A text list includes one or more text lines. For area text, words are added to a text line until the text line reaches a limit (e.g., the text line width of the text box is met or exceeded), at which point the last glyph or whole word is moved to the start of the next text line.

Figure 4A:
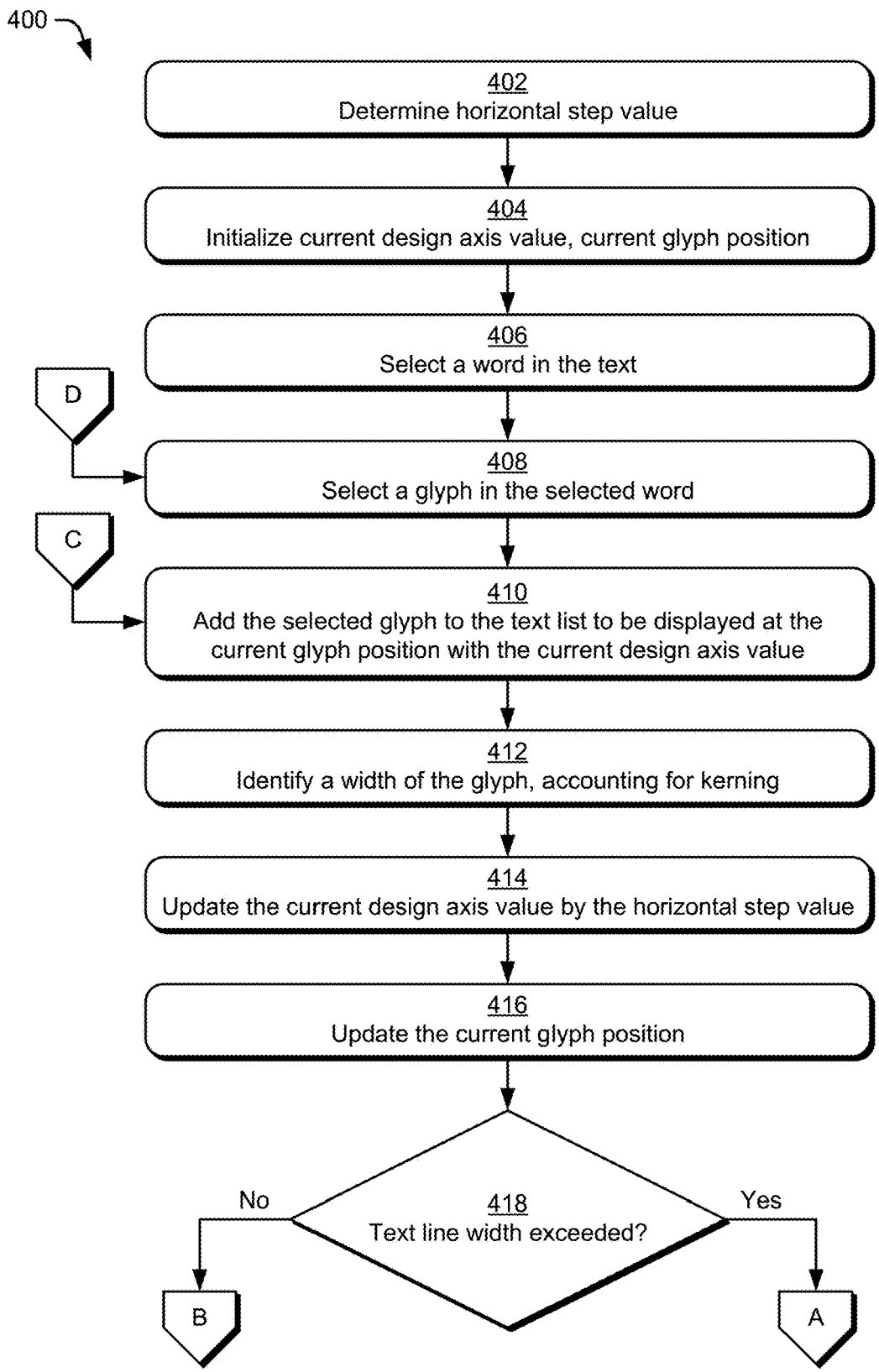
FIGS. 4A and 4B are a flow diagram depicting a procedure in an example implementation of generating design axis values for glyphs along a horizontal axis.
Figure 4B:
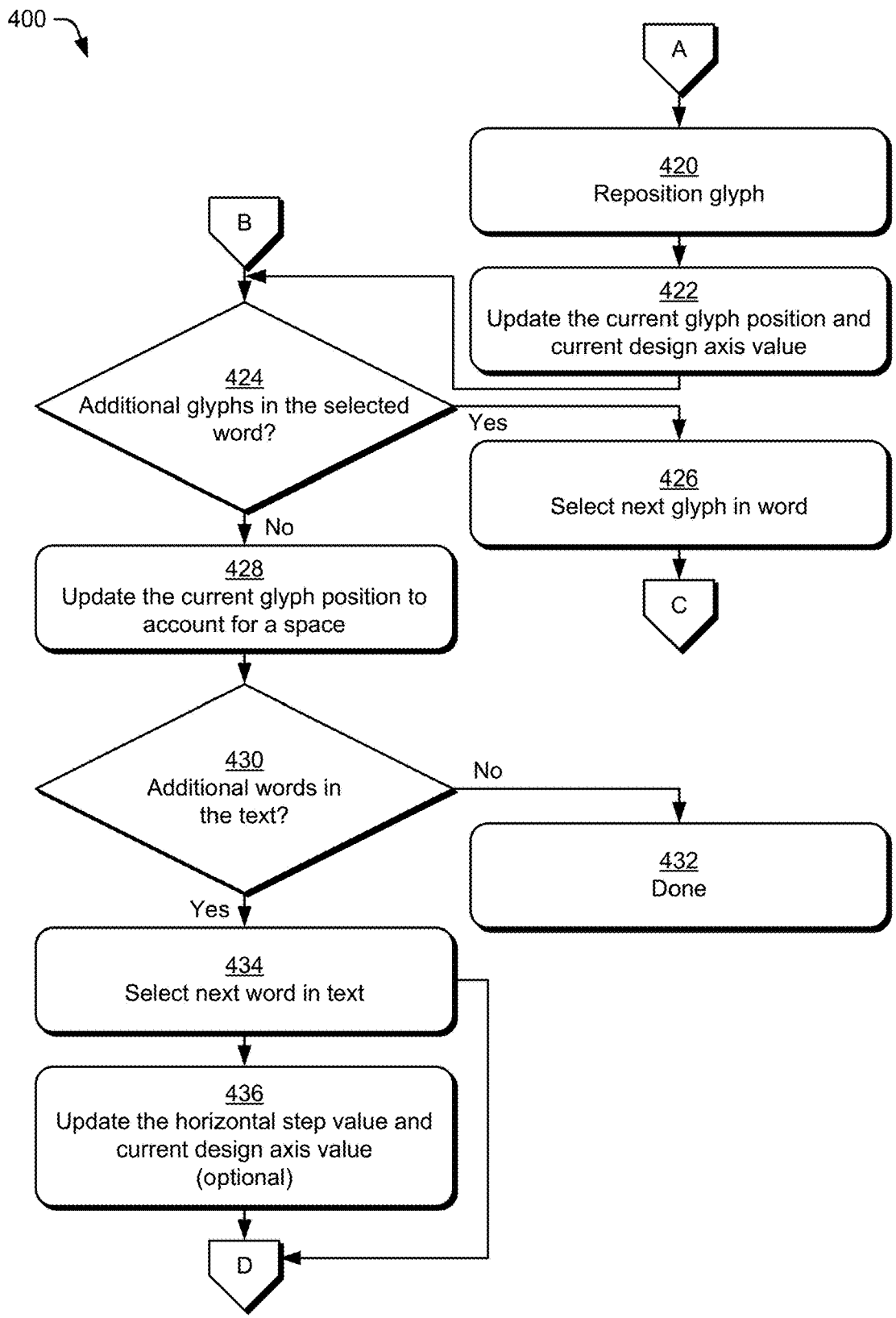

FIGS. 4A and 4B are a flow diagram 400 depicting a procedure in an example implementation of generating design axis values for glyphs along a horizontal axis. Aspects of the procedure are implemented in hardware, firmware, software, or a combination thereof. The procedure is performed at least in part by, for example, the horizontal axis distribution determination module 204 of FIG. 2. In one or more embodiments, the procedure performs the automatically generating design axis values of block 308 of FIG. 3. The procedure is shown as a set of blocks that specify operations performed by one or more devices and are not necessarily limited to the orders shown for performing the operations by the respective blocks.

In this example, a horizontal step value for the design axis is determined (block 402). The horizontal step value is determined as discussed above.

Initial values are set for the design axis value and the current glyph position (block 404). The initial design axis value varies based on the distribution profile and is the lower value limit if the distribution profile is low to high and is the upper value limit if the distribution profile is high to low. The initial current glyph position is the beginning of the text line.

A word from the collection of glyphs 220 is selected (block 406). Initially, the first word in the collection of glyphs 220 is selected.

A glyph from the selected word is selected (block 408). Initially, the first glyph in the selected word is selected in block 408.

The selected glyph is added to the text list to be displayed at the current glyph location with the current design axis value (block 410).

A width of the glyph is identified, accounting for kerning (block 412). In some situations, two adjacent glyphs have different kerning values (different amounts of space between glyphs) due to different design axis values being generated for the glyphs. In such situations the kerning values for the two glyphs are combined in some manner, such as averaged, to generate the kerning value. A modified glyph width for the selected glyph is generated by adding the width of the selected glyph (given the design axis value of the selected glyph) to the kerning value for the selected glyph.

In one or more implementations, if the next glyph after the selected glyph is in the selected word, then the kerning value for the selected glyph is determined as discussed above. However, if the next glyph after the selected glyph is not in the selected word (e.g., the next glyph is a space glyph), then the kerning value for the selected glyph is the kerning value for the selected glyph. Accordingly, if the next glyph after the selected glyph is not in the selected word, then a modified glyph width as discussed above need not be generated.

The current design axis value is updated by the horizontal step value (block 414). This horizontal step value is the horizontal step value determined in block 402. In one or more implementations, the current design axis value is updated by adding the horizontal step value to the current design axis value (in situations in which design axis values are increasing left to right) or by subtracting the horizontal step value from the current design axis value (in situations in which design axis values are decreasing from left to right).

The current glyph position is updated (block 416). The current glyph position is updated by incrementing the current glyph position by the modified glyph width (as determined in block 412) if the next glyph after the selected glyph is in the selected word and by the width of the glyph if the next glyph after the selected glyph is not in the selected word.

A check is then made as to whether the text line width is exceeded (block 418). In one or more implementations, this check is made for area text. If point text is being entered, then the check in block 418 need not be made and the procedure proceeds to block 424 as discussed in more detail below.

Whether the text line width is exceeded is determined in any of a variety of different manners. For example, if the current glyph position as updated in block 416 is equal to or exceeds the edge of the text block then the text line width is exceeded. By way of another example, if the current glyph position as updated in block 416 is within a threshold distance of the edge of the text block (e.g., a distance equal to the smallest glyph width for the variable font) then the text line width is exceeded.

If the text line width is exceeded, the selected glyph is repositioned (block 420 of FIG. 4B). The selected glyph is repositioned in any of a variety of different manners. In one or more implementations, the selected glyph is repositioned by being moved to the next text line. E.g., rather than remaining at its current glyph position in the text list, the glyph is moved to the beginning of the next lower text line. Additionally or alternatively, the selected glyph is repositioned by moving the word that includes the selected glyph to the beginning of the next text line. Additionally or alternatively, the selected glyph is repositioned by being replaced with a hyphen and moved to the beginning of the next text line. E.g., rather than remaining at its current glyph position in the text list, the glyph is moved to the next lower text line and a hyphen is included in the text list at the location where the current glyph position had been and having the design axis value that the moved glyph had had.

The current glyph position and current design axis value are updated (block 422). The manner in which these are updated and the flow of the procedure varies dependent on the manner in which the glyph is repositioned in block 420. For example, if the glyph is moved to the beginning of the next lower text line, the current glyph position is the beginning of the next lower text line and the current design axis value is the lower value limit. The procedure then returns to block 410 to place the glyph at the current glyph position. By way of another example, if the word including the glyph is moved to the beginning of the next text line, the current glyph position is the beginning of the next lower text line and the current design axis value is the lower value limit. The procedure then returns to block 408 to place the glyphs in the word beginning at the current glyph position.

The procedure then proceeds based on whether there are any additional glyphs in the selected word (block 424). If there is at least one additional glyph in the selected word, the next glyph in the word is selected (block 426). The procedure then returns to block 410 to include the newly selected glyph in the text list.

If there is not at least one additional glyph in the selected word, the current glyph position is updated to account for a space (block 428). The current glyph position is updated, for example, by incrementing the current glyph position by the width of a glyph of a space in the variable font (given the current design axis value).

The procedure then proceeds based on whether there are any additional words in the text (block 430). If there are no additional words in the text, the procedure ends (block 432). However, if there is at least one additional word in the text, the next word in the text is selected (block 434). The procedure then returns to block 408 to select a glyph in the newly selected word.

The flow diagram 400 is discussed with including words and glyphs in a text list in the direction from left to right and top to bottom. It is to be appreciated that the flow diagram 400 is readily modifiable to account for different directions of words and glyphs, such as from right to left, from bottom to top, and so forth.

Returning to FIG. 2, the horizontal axis distribution determination module 204 provides the generated text list to the display module 210 as display text 224. The display module 210 displays the display text 224, which has the design axis values distributed across the horizontal lines of text.

FIG. 5 illustrates examples of text generated by the horizontal axis distribution determination module 204. Example 502 illustrates multiple lines of text with variable font width distributed across each line left to right from low width to high width. Example 504 illustrates multiple lines of text with variable font width distributed across each line left to right from high width to low width. Example 506 illustrates a line of text with variable font distributed left to right from low weight to high weight and low optical size (height) to high optical size (height).

Returning to FIG. 2, in one or more implementations the horizontal axis distribution determination module 204 supports replacing one glyph with another, such as glyph substitutions or variations. For example, assume a variable font has a default glyph for the dollar sign with two vertical strokes running through the full extent of the glyph. In some situations (e.g., a bold or weight design axis value being greater than a threshold amount) the default glyph is substituted with an alternate (replacement) glyph that has only one vertical stroke to improve the appearance of the glyph. The situations in which the default glyph is to be substituted with the replacement glyph are specified in various manners, such as being default settings established by a developer or designer of the variable font, being user input identifying which glyphs of a variable font are to be replaced with which other glyphs and rules indicating when they are to be replaced, and so forth.

The design axis value for the replacement glyph remains the same as was used for the default glyph (e.g., in block 410 of flow diagram 400). However, in some situations the width of the default glyph and the replacement glyph are different. In such situations, the width of the replacement glyph is used for further computation in displaying the glyph. For example, in block 412 of flow diagram 400, the width of the replacement glyph is identified rather than the width of the default glyph.

It is to be noted that situations also arise in which multiple default glyphs are substituted with a single replacement glyph, such as a ligature or conjunct glyph. As an example, consider two glyphs g1 and g2 being substituted with a new ligature glyph g3. In such situations, the substitution is made and the width of the new ligature glyph g3 is used for further computation in displaying the glyph. For example, in block 412 of flow diagram 400, the width of the replacement glyph is identified rather than the width of the default glyph. Furthermore, the design axis value used for one of the default glyphs (e.g., glyph g) is used (e.g., in block 410 of flow diagram 400) as the design axis value of the new ligature glyph g3. Additionally or alternatively, the design axis values for the text line are re-determined based on the new number of glyphs in the line (which has been reduced by one).

Discussions above refer to generating design axis values distributed between the upper value limit and the lower value limit on a per-line basis. Additionally or alternatively the horizontal axis distribution determination module 204 automatically generates design axis values distributed between the upper value limit and the lower value limit on a per-word basis rather than a per-line basis. In such situations, the horizontal axis distribution determination module 204 generates a horizontal step value for each word based on the number of glyphs in the word.

Referring to flow diagram 400 again, in situations in which design axis values are distributed on a per-word basis, the horizontal step value is determined (e.g., block 402) based on the number of glyphs in the first word in the collection of glyphs 220. The horizontal step value is determined by computing the difference between the upper value limit and the lower value limit, and dividing the difference by the number of glyphs (characters) in the word.

Additionally, the flow diagram 400 includes an optional block 436 for situations in which design axis values are distributed on a per-word basis. In block 436 the horizontal step value is determined for the newly selected word from block 434, for example by computing the difference between the upper value limit and the lower value limit, and dividing the difference by the number of glyphs (characters) in the newly selected word. Additionally, the current design axis value is reset to be the lower value limit. The procedure then returns to block 408 to select a glyph in the newly selected word.

FIG. 6 illustrates examples of text generated by the horizontal axis distribution determination module 204 on a per-word basis. Example 602 illustrates multiple lines of text with variable font weight distributed across each word left to right from low weight to high weight. Example 604 illustrates multiple lines of text with variable font weight distributed across each word left to right from high weight to low weight. Example 606 illustrates a line of text with variable font distributed across each word from low weight to high weight and from low optical size (height) to high optical size (height).

Returning to FIG. 2, discussions above refer to generating design axis values distributed between the upper value limit and the lower value limit that varies for each glyph in the text line. Additionally or alternatively the horizontal axis distribution determination module 204 automatically generates design axis values distributed between the upper value limit and the lower value limit that varies for each word in the text line, with each glyph in the word having the same design axis value (also referred to as keeping equal variation in each glyph of a word). In such situations, the horizontal axis distribution determination module 204 generates a horizontal step value for each text line based on the number of words in the text line.

Referring to flow diagram 400 again, in situations in which design axis values are distributed to vary for each word in the text line but give each glyph in a word the same design axis value, the horizontal step value is determined (e.g., block 402) based on the number of words in the text line. The horizontal step value is determined by computing the difference between the upper value limit and the lower value limit, and dividing the difference by the number of words in the text line. Additionally, the current design axis value is not updated (e.g., block 414 or 422) until the end of the word is reached (e.g., until the next word in the text is selected in block 434).

Returning to FIG. 2, the vertical axis distribution determination module 206 implements functionality to automatically generate values for glyphs along the vertical axis and along each design axis indicated in the variable font parameters 222. The vertical axis distribution determination module 206 determines a vertical step value indicating the amount that the value along the design axis changes between each line of text. In situations in which variable font parameters 222 indicate multiple design axes, the range of design axis values is oftentimes different for the different design axes, so a different vertical step value is determined for each design axis. The vertical step value varies based on the upper value limit for the design axis, the lower value limit for the design axis, and the number of lines of text.

Figure 7:
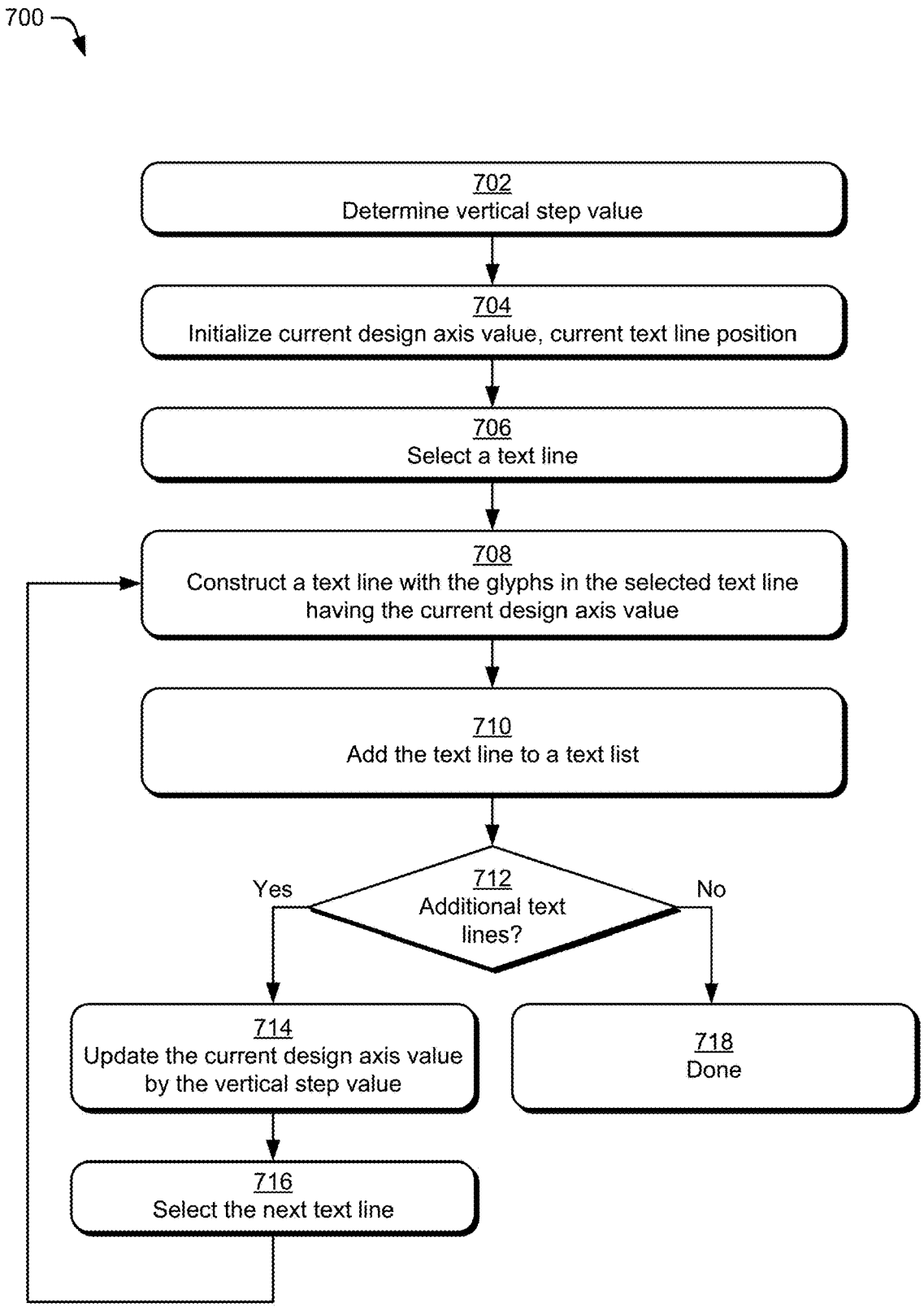
FIG. 7 is a flow diagram depicting a procedure in an example implementation of generating design axis values for glyphs along a vertical axis.

FIG. 7 is a flow diagram 700 depicting a procedure in an example implementation of generating design axis values for glyphs along a vertical axis. Aspects of the procedure are implemented in hardware, firmware, software, or a combination thereof. The procedure is performed at least in part by, for example, the vertical axis distribution determination module 206 of FIG. 2. In one or more embodiments, the procedure performs the automatically generating design axis values of block 308 of FIG. 3. The procedure is shown as a set of blocks that specify operations performed by one or more devices and are not necessarily limited to the orders shown for performing the operations by the respective blocks.

In this example, a vertical step value for the design axis is determined (block 702). In certain situations (e.g., situations in which the glyphs are input as area text), a target number of text lines is determined based on the upper value limit for the design axis, the lower value limit for the design axis, and the number of glyphs in the collection 220. The target number of text lines refers to the number of text lines that are to be used to display the collection 220 accounting for the different design axis values for the glyphs. Determining the target number of text lines provides a more uniform distribution of design axis values along the vertical axis relative to determining the number of text lines based solely on the upper value limit or the lower value limit.

In one or more implementations, the target number of text lines is determined by determining a number of text lines with glyphs of the collection 220 at the lower value limit for each design axis indicated in the variable font parameters 222, referred to as the lower number of text lines. Additionally, a number of text lines with glyphs of the collection 220 at the upper value limit for each design axis indicated in the variable font parameters 222 is determined, referred to as the upper number of text lines. The vertical axis distribution determination module 206 determines the target number of text lines by combining (e.g., averaging) the lower number of text lines and the upper number of text lines.

Additionally or alternatively, the target number of text lines is determined using any of a variety of search techniques, such as a binary search. For example, different numbers of text lines are used in each of multiple runnings of the procedure of flow diagram 700 to determine the target number of text lines. The result of using each target number of text lines is evaluated to determine whether using the target number of text lines resulted in the last text line having the upper value limit or the lower value limit (depending on the distribution profile) and whether any text lines had the same design axis value. The target number of text lines is then updated until using the target number of text lines resulted in the last text line having the upper value limit or the lower value limit (depending on the distribution) and no text lines have the same design axis value.

The vertical step value is determined by computing the difference between the lower value limit for the design axis indicated in the variable font parameters 222 and the upper value limit for the design axis indicated in the variable font parameters 222. This difference is divided by the target number of text lines.

Initial values are set for the current design axis value and the current text line position (block 704). The initial current design axis value varies based on the distribution profile and is the lower value limit if the distribution profile is low to high and is the upper value limit if the distribution profile is high to low. The initial current text line position is the beginning location for the display of the collection of glyphs within a particular display area (e.g., the top left of a user selected area for area text).

A text line to display at least a portion of the collection of glyphs is selected (block 706). Initially, the first text line in the display area (e.g., the top line) is selected.

A text line with the glyphs in the selected line having the current design axis value is constructed (block 708). If the width of the text line is reached, then adding glyphs to the text line ceases so the glyph (or word including the glyph) is included in the next line. Glyphs are added to the text line in a manner analogous to that discussed in flow diagram 400, although the design access value remains the same for all glyphs in the text line.

The constructed text line is added to a text list (block 710).

The procedure then proceeds based on whether there are any additional text lines (block 712). If there is at least one additional glyph in the collection of glyphs that has not been added to a text line, the current design axis value is updated by the vertical step value (block 714) and the next text line in the display area is selected (block 716). In one or more implementations, the current design axis value is updated by adding the vertical step value to the current design axis value (in situations in which design axis values are increasing top to bottom) or by subtracting the vertical step value from the current design axis value (in situations in which design axis values are decreasing from top to bottom). The procedure then returns to block 708 to construct a text object for the newly selected text line.

Returning to block 712, if there are no additional glyphs in the collection of glyphs that have not been added to a text line, the procedure ends (block 718).

It is to be appreciated that the flow diagram 700 is applicable to a collection of glyphs to account for different directions of words and glyphs, such as from left to right, from right to left, from top to bottom, from bottom to top, and so forth.

The flow diagram 700 is discussed with reference to a collection of glyphs being input as area text. In situations in which the glyphs are input as point text, the vertical step value is determined by computing the difference between the upper value limit and the lower value limit, and dividing the difference by the number of text lines in the collection 220. When using point text, a new line is created in response to a new line request from the user (e.g., a carriage return). Accordingly, the number of text lines in the collection 220 changes as the glyphs in the collection 220 are received. In one or more implementations, each time a new line request is received the procedure of flow diagram 700 is repeated, generating a new vertical step value and the assigning design axis values to glyphs in lines of based on the new vertical step value.

Returning to FIG. 2, the vertical axis distribution determination module 206 provides the generated text list to the display module 210 as display text 226. The display module 210 displays the display text 226, which has the design axis values distributed across the vertical lines of text.

FIG. 8 illustrates an example 802 of text generated by the vertical axis distribution determination module 206. As illustrated, the lines of text with variable font are distributed top to bottom from low weight to high weight. However, for each line the glyphs in the line have the same weight.

Returning to FIG. 2, the diagonal axis distribution determination module 208 implements functionality to automatically generate values for glyphs along both the horizontal axis and the vertical axis, and along each design axis indicated in the variable font parameters 222. The diagonal axis distribution determination module 208 determines a horizontal step value indicating the amount that the value along the design axis changes between each glyph in a line of text and a vertical step value indicating the amount that the value along the design axis changes between each line of text. In situations in which variable font parameters 222 indicate multiple design axes, the range of design axis values is oftentimes different for the different design axes so different horizontal step and vertical step values are determined for each design axis. The horizontal step and vertical step values vary based on the upper value limit for the design axis, the lower value limit for the design axis, the number of characters in the line of text, and the number of lines of text.

Figure 9:
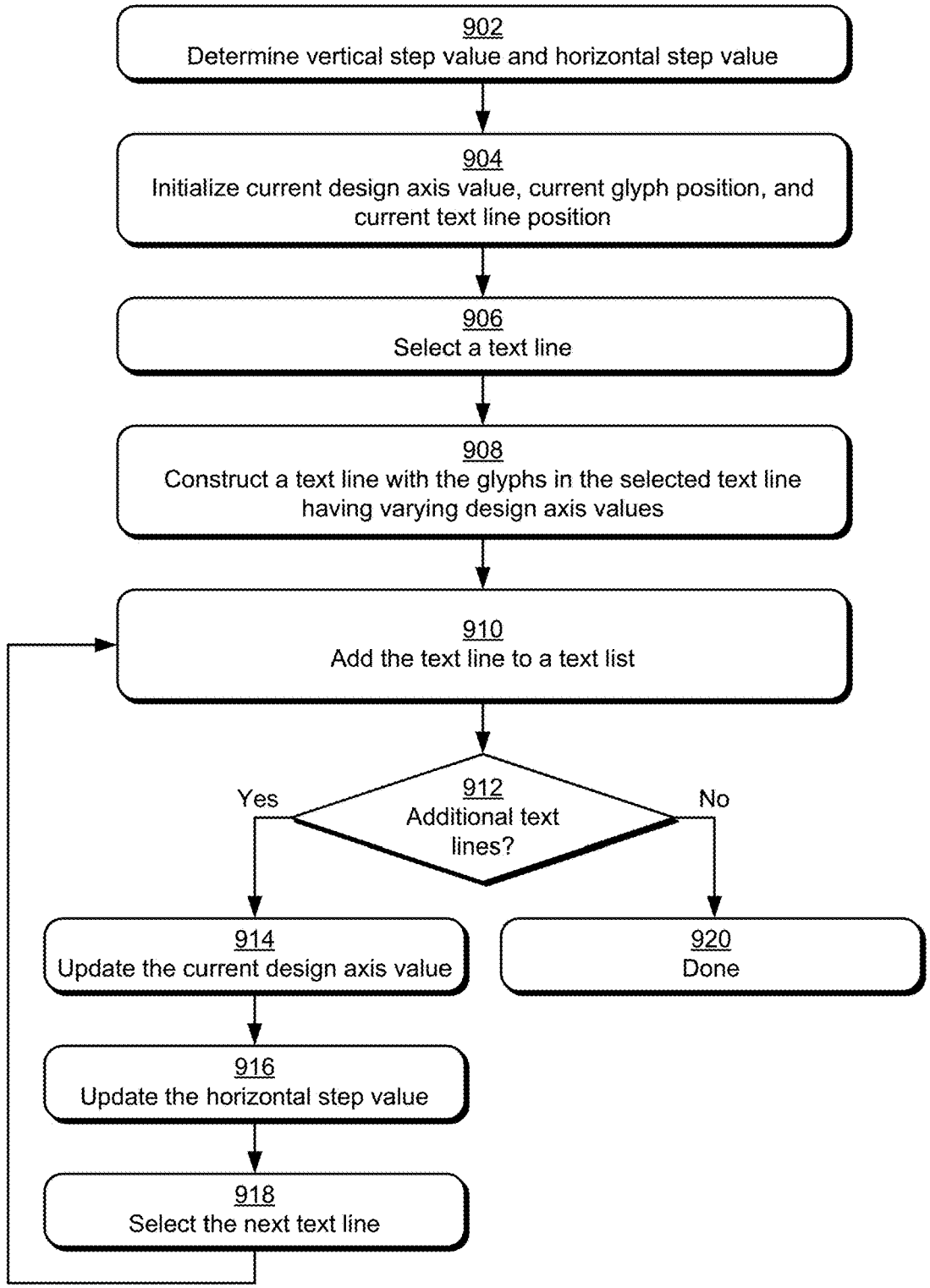
FIG. 9 is a flow diagram depicting a procedure in an example implementation of generating design axis values for glyphs along both a vertical axis and horizontal axis.

FIG. 9 is a flow diagram 900 depicting a procedure in an example implementation of generating design axis values for glyphs along both a vertical axis and horizontal axis. Aspects of the procedure are implemented in hardware, firmware, software, or a combination thereof. The procedure is performed at least in part by, for example, the diagonal axis distribution determination module 208 of FIG. 2. In one or more embodiments, the procedure performs the automatically generating design axis values of block 308 of FIG. 3. The procedure is shown as a set of blocks that specify operations performed by one or more devices and are not necessarily limited to the orders shown for performing the operations by the respective blocks.

In this example, a vertical step value for the design axis and a horizontal step value for the design axis are determined (block 902). These step values are determined analogous to the discussion above (e.g., with reference to flow diagrams 400 and 700).

Initial values are set for the current design axis value, the current glyph position, and the current text line position (block 904). These initial values are set analogous to the discussion above (e.g., with reference to flow diagrams 400 and 700).

A text line to display at least a portion of the collection of glyphs is selected (block 906). Initially, the first text line in the display area (e.g., the top line) is selected.

A text line with the glyphs in the selected line having varying design axis values is constructed (block 908). Initially, these design axis values range from the initial current design axis value set in block 904 to the upper value limit for the design axis. However, this range changes for additional lines of text as discussed in more detail below. The text line for the selected line of text is generated analogous to the discussion above (e.g., with reference to flow diagram 400).

The constructed text line is added to a text list (block 910).

The procedure then proceeds based on whether there are any additional text lines (block 912). If there is at least one additional glyph in the collection of glyphs that has not been added to a text line, the current design axis value is updated (block 914). The current design axis value is updated (e.g., incremented or decremented, depending on whether design axis values are increasing from top to bottom or decreasing from top to bottom) by an amount equal to the sum of the vertical step value and the design axis value at the beginning of the selected text line.

The horizontal step value is also updated (block 916). The horizontal step value is updated by computing a new horizontal step value that is the difference between the upper value limit and the current design axis value (as updated in block 914), and dividing the difference by the average number of characters in a text line. Additionally or alternatively, the horizontal step value is updatable in other manners, such as computing as the new horizontal step value a value that is the difference between the upper value limit and the design axis value at the beginning of the selected text line, and dividing the difference by the average number of characters in a text line.

The next text line in the display area is selected (block 918). The procedure then returns to block 910 to construct a text line for the newly selected text line. The design axis value for the newly selected text line begins with the updated current design axis value (as updated in block 914) and the updated horizontal step value (as updated in block 916).

Returning to block 912, if there are no additional glyphs in the collection of glyphs that have not been added to a text line, the procedure ends (block 920).

It is to be appreciated that the flow diagram 900 is applicable to a collection of glyphs to account for different directions of words and glyphs, such as from left to right, from right to left, from top to bottom, from bottom to top, and so forth.

The flow diagram 900 is discussed with reference to a collection of glyphs being input as area text. In situations in which the glyphs are input as point text, the vertical step value is determined by computing the difference between the upper value limit and the lower value limit, and dividing the difference by the number of text lines in the collection 220. When using point text, a new line is created in response to a new line request from the user (e.g., a carriage return). Accordingly, the number of text lines in the collection 220 changes as the glyphs in the collection 220 are received. In one or more implementations, each time a new line request is received the procedure of flow diagram 900 is repeated, generating a new vertical step value and the assigning design axis values to glyphs in lines of based on the new vertical step value.

Returning to FIG. 2, the diagonal axis distribution determination module 208 provides the generated text list to the display module 210 as display text 228. The display module 210 displays the display text 228, which has the design axis values distributed diagonally across both the vertical and horizontal lines of text.

FIG. 10 illustrates examples of text generated by the diagonal axis distribution determination module 208. As illustrated in example 1002, the lines of text with variable font are distributed top left to bottom right from low weight to high weight. As illustrated in example 1004, the lines of text with variable font are distributed top left to bottom right from high weight to low weight.

Returning to FIG. 2, the variable font parameters 222 include a distribution profile identifying the manner in which values are assigned to or generated for glyphs displayed as text as discussed above. In one or more implementations, the distribution profile is a gradient. The gradient is identified in various manners, such as received as user input (e.g., a definition of the gradient specified by the user), received or copied from another device or system, and so forth. Accordingly, the distribution profile used by the automatic font value distribution system is user-definable.

In one or more implementations, the gradient is a color distribution between two values, such as 0 (e.g., representing black) and 1 (e.g., representing white). The values at locations along the gradient are mapped to corresponding glyph locations and used to determine the design axis value for the glyphs, resulting in a distribution of design axis values that corresponds to the gradient. This mapping is readily performed in various manners (e.g., based on the width or length of the gradient and the area in which text is entered, or based on the width or length of the gradient and the number of text lines to be displayed). The gradient is a color distribution in one or both of the vertical and horizontal directions, such as from left to right, from right to left, from top to bottom, from bottom to top, and so forth. The gradient takes one of various forms, such as an input image, a vector of stop-offsets and corresponding color values, and so forth.

The gradient includes multiple stop-offsets, including an initial stop-offset and a final stop-offset. The initial stop-offset indicates the beginning or starting of the gradient and the final stop-offset indicates the ending of the gradient. Furthermore, the gradient optionally includes one or more stop-offsets where the gradient changes (e.g., switches directions, such as switches from going white to black to going black to white). The gradient is able to include any number of stop-offsets in addition to the initial stop-offset and the final stop-offset.

Figure 11:
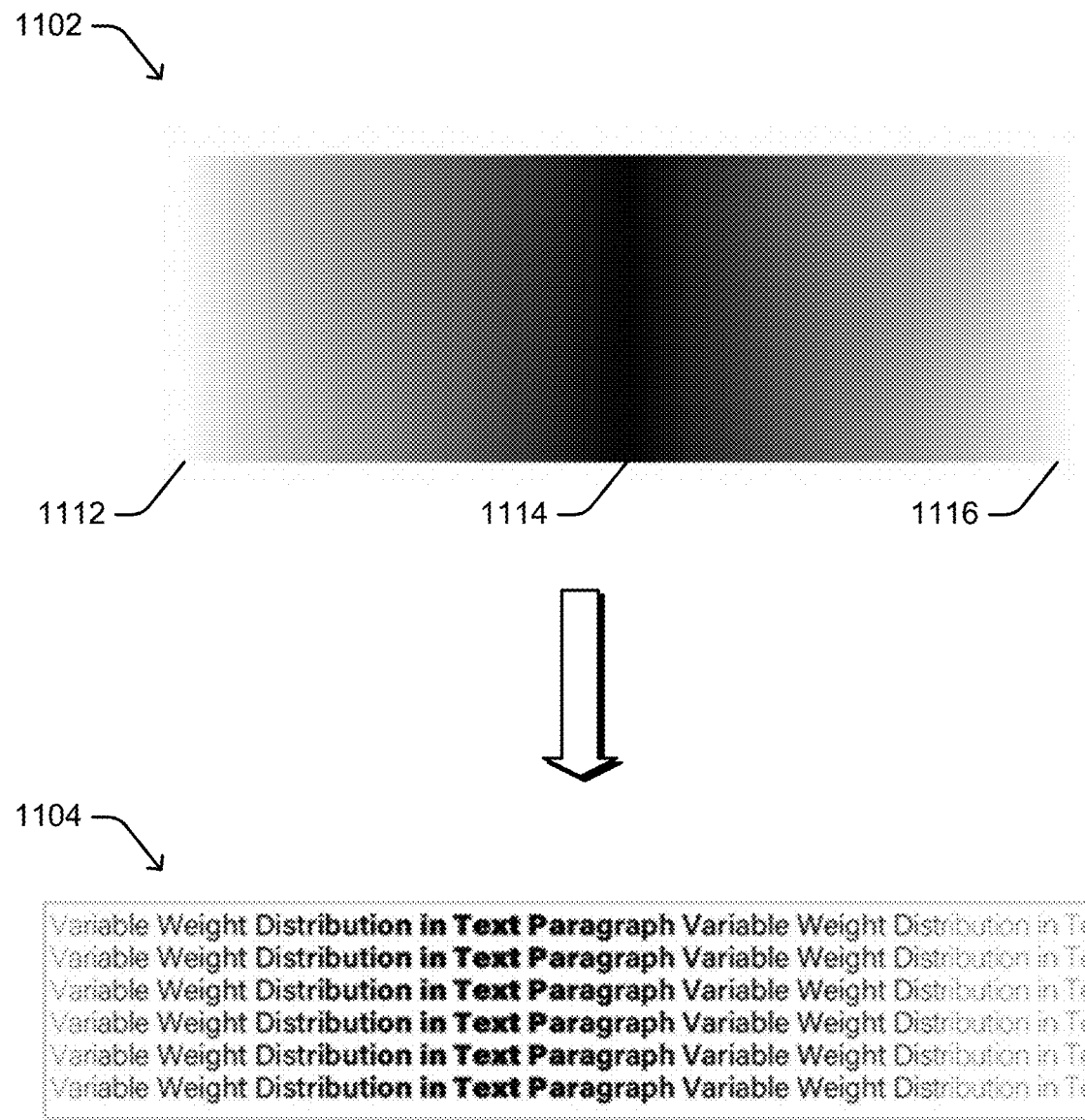
FIG. 11 illustrates an example of text generated based on a gradient distribution profile.

FIG. 11 illustrates an example of text generated based on a gradient distribution profile. A gradient 1102 is illustrated that ranges from white on the left to black in the middle and back to white on the right. Using this gradient as the distribution profile, the design axis values for glyphs are generated as illustrated at 1104, ranging from low weight on the left to high weight in the middle and back to low weight on the right.

Three stop-offsets 1112, 1114, and 1116 are illustrated. Stop-offset 1112 is the initial stop-offset starting with the gradient going from white to black. At stop-offset 1114 the gradient switches from going white to black to going black to white. Stop-offset 1116 is the final stop-offset ending with the gradient going black to white between stop-offset 1114 and stop-offset 1116. Although three stop-offsets are illustrated in FIG. 11, it is to be noted that the gradient optionally includes any number of stop-offsets between the initial stop-offset and the final stop-offset.

Each stop-offset has a corresponding color value and a corresponding location value. The color value corresponding to a stop-offset is, for example, a color value between 0 (indicating black or the blackest color in the gradient) and 1 (indicating white or the whitest color in the gradient). The location value corresponding to a stop-offset is, for example, a value between 0 and 1 indicating how close the stop-offset is to the initial stop-offset and the final stop-offset. For example, stop-offset 1112 has a corresponding color value of 1 and a location value of 0.0, stop-offset 1114 has a corresponding color value of 0 and a location value of 0.5, and stop-offset 1116 has a corresponding color value of 1 and a location value of 1.0.

A uniform distribution is computed between each two consecutive stop-offsets using the color values corresponding to the stop-offsets. Depending on the distribution between two consecutive stop-offsets, a normalized color value is generated for each glyph position. For each glyph at a given position the design axis value is determined based on the normalized color value for the glyph position.

The locations along the horizontal axis or vertical axis of the text are mapped to locations on the gradient. Accordingly, a location half-way between the beginning and ending of a horizontal text line is mapped to a location half-way between the start stop-offset and the end stop-offset, a location 20% away from the beginning of a horizontal text line is mapped to a location 20% away from the start stop-offset along the gradient, and so forth.

The normalized color value and the design axis value for a glyph at a location mapped between two consecutive stop-offsets (referred to as a start stop-offset and an end stop-offset) are generated based on an offset difference and a color difference. The offset different is the difference between the location values corresponding to the two stop-offsets. The color difference is the difference between the color values corresponding to the two stop-offsets. Additionally, an average number of characters between the two stop-offsets is calculated by multiplying the text line width by the offset difference, and dividing the product by the average character width in the text line.

For a glyph i in a text line between two consecutive stop-offsets (referred to as a start stop-offset and an end stop-offset), the normalized color (normalizedColori) is determined as:

$$normalizedColor_i = StartOffsetColor + \frac{Color\_diff}{avgNumOfCharacters} * i$$

where StartOffsetColor refers to the color value corresponding to the start stop-offset, Color_diff refers to the difference between the color values corresponding to the start stop-offset and the end stop-offset, and avgNumOfCharacters refers to the average number of characters between two stop-offsets.

The design axis value for a glyph i (AxisValuei) in a text line between two consecutive stop-offsets (referred to as a start stop-offset and an end stop-offset) is determined as:

$$AxisValue_i = LowerValueLimit + (UpperValueLimit - LowerValueLimit) * normalizedColor_i$$

where LowerValueLimit refers to the lower value limit for the design axis and UpperValueLimit refers to the upper value limit for the design axis.

Although illustrated in FIG. 11 as the design axis values varying across the horizontal axis based on a gradient, additionally or alternatively design axis values vary across the vertical axis based on a gradient or across both the vertical axis and the horizontal axis (diagonally) based on a gradient. The design axis values vertically are identified analogous to the discussions above, using the gradient rather than determining a vertical step value. Similarly, the design axis values diagonally are identified analogous to the discussions above, using the updated lower value limit or upper value limit as discussed above in determining the design axis value for a glyph i (AxisValuei).

Furthermore, although discussed with reference to a black and white gradient, additionally or alternatively the gradient is one or more other colors. As an example, a red gradient is usable by the automatic font value distribution system 106 with locations along the gradient being determined in analogous to the discussion above and where stop-offsets change in response to the color values switching from going towards the color value corresponding to the initial stop-offset and going towards the color value corresponding to the final stop-offset (or vice versa).

In the discussions herein, reference is made to variable fonts having multiple design axes along which design axis values vary when displaying a collection of glyphs. The design axis values along those design axes are determined in various manners, such as sequentially (e.g., apply one design axis to all glyphs then another design axis), concurrently (e.g., apply all design axes to a glyph before proceeding to next glyph, apply all design axes to a text line before proceeding to a next text line), a combination thereof, and so forth. Situations arise in which the application of one design axis alters the text layout after a previous design axis was applied, resulting in re-application of the previous design axis. As an example, assume a first design axis of slant is applied followed by a second design axis of weight. The increased weight causes a last word in a text line to be moved down to the next line, in which case the first design axis is re-applied to the line (after movement of the last word) so that the slant design axis values appropriately range between the lower value limit to the upper value limit.

Additionally, reference is made to distributing or assigning design axis values between the lower and upper value limits In one or more implementations, this distribution is approximately a uniform distribution (e.g., the design axis values vary by a small amount from a purely uniform distribution, such as by 5%).

Furthermore, in one or more implementations situations arise in which one or more values are not determined correctly, resulting in the current design axis value not being able to be updated (e.g., updating the current design axis value by the horizontal step value or the vertical step value would result in the lower value limit or upper value limit being exceeded). In such situations, the current design axis value remains the same (e.g., is updated by a value of zero).

Figure 12:
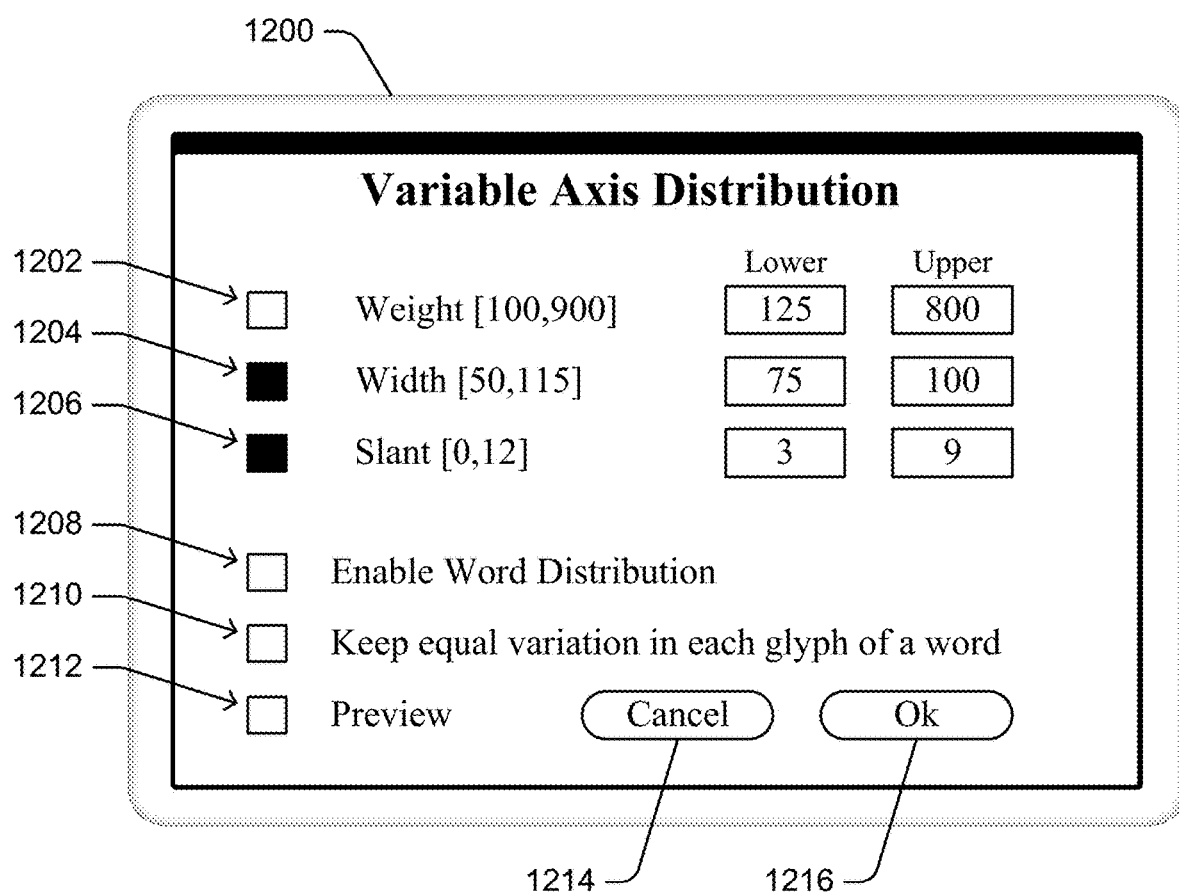
FIG. 12 illustrates an example user interface allowing variable font parameters to be input by a user.

FIG. 12 illustrates an example user interface 1200 allowing variable font parameters to be input by a user. The user interface 1200 is displayed, for example, by the user interface module 202 of FIG. 2. The user interface 1200 includes selection options for three different characteristics of a variable font: weight, width, and slant. Weight settings 1202 are illustrated, including a check box (currently not selected) allowing the weight design axis to be selected. The weight settings 1202 also indicate a smallest lower value limit and largest upper value limit for the weight design axis (100 and 900 in the illustrated example) and allow user input specifying lower and upper value limits that the automatic font value distribution system 106 is to use (125 and 800 in the illustrated example).

Width settings 1204 are also illustrated, including a check box (currently selected) allowing the width design axis to be selected. The width settings 1204 also indicate smallest lower value limit and largest upper value limit for the width design axis (50 and 115 in the illustrated example) and allow user input specifying lower and upper value limits that the automatic font value distribution system 106 is to use (75 and 100 in the illustrated example).

Slant settings 1206 are also illustrated, including a check box (currently selected) allowing the slant design axis to be selected. The slant settings 1206 also indicate smallest lower value limit and largest upper value limit for the slant design axis (0 and 12 in the illustrated example) and allow user input specifying lower and upper value limits that the automatic font value distribution system 106 is to use (3 and 9 in the illustrated example).

An enable word distribution setting 1208 (currently not selected) is selectable by the user to cause variable font values to be distributed between the upper value limit and the lower value limit on a per-word basis rather than a per-line basis. A keep equal variation in each glyph of a word setting 1210 (currently not selected) is selectable by the user to cause variable font values to be distributed between the upper value limit and the lower value limit while keeping the values for each glyph in a word the same. A preview setting 1212 (currently not selected) is selectable by the user to cause a preview of text with the currently selected settings to be displayed.

A cancel button 1214 is displayed and is selectable by a user to close the user interface 1200 and not have any settings made in the user interface 1200 applied by the automatic font value distribution system 106. An ok button 1216 is selectable by a user to close the user interface and have the settings made in the user interface 1200 applied by the automatic font value distribution system 106.

Figure 13:
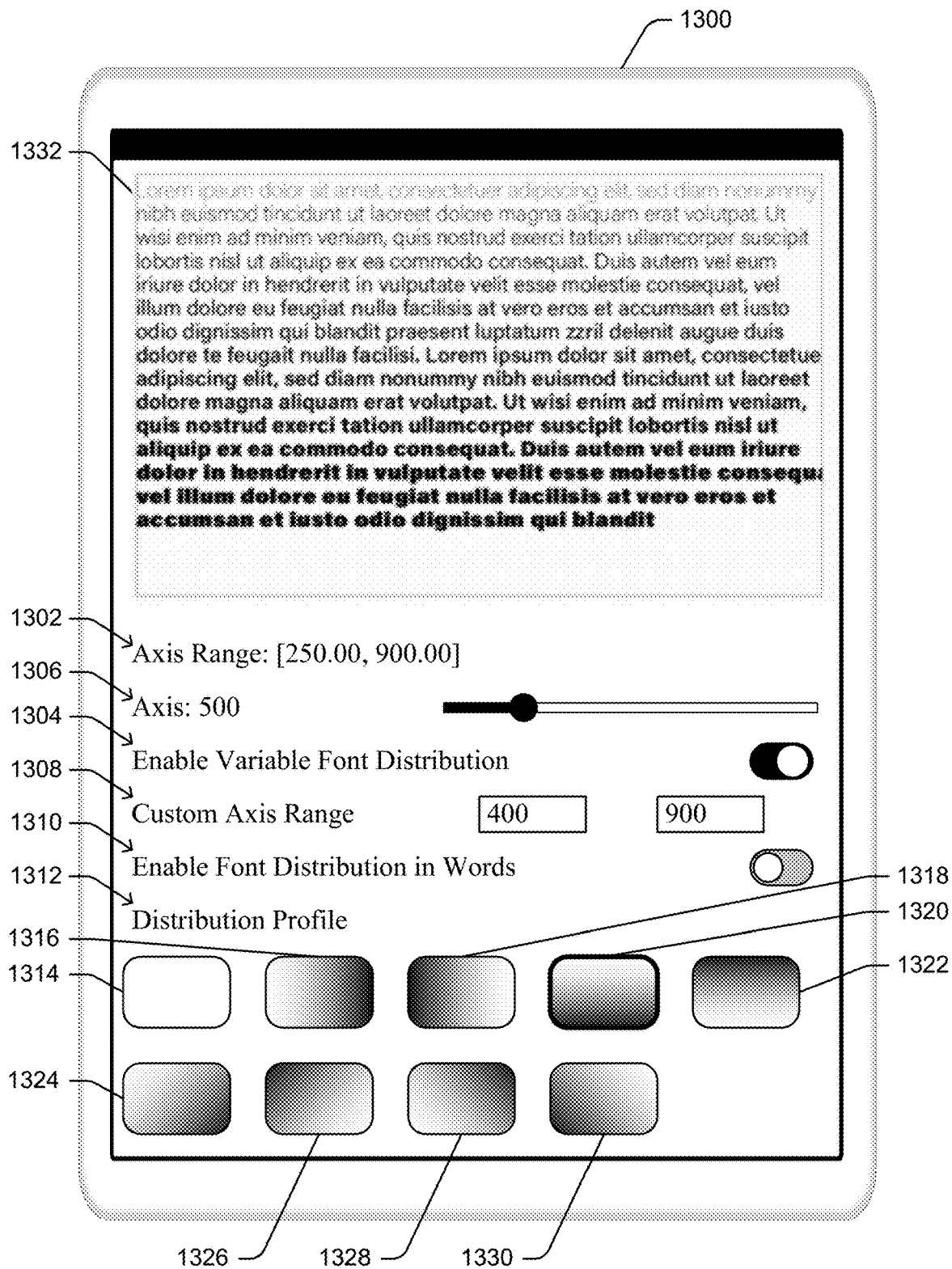
FIG. 13 illustrates another example user interface allowing variable font parameters to be input by a user.

FIG. 13 illustrates another example user interface 1300 allowing variable font parameters to be input by a user. The user interface 1300 is displayed, for example, by the user interface module 202 of FIG. 2. The user interface 1300 includes selection options for a single design axis (weight in the illustrated example), although optionally includes selection options for one or more additional axes.

An axis range 1302 is displayed indicating a smallest lower value limit and largest upper value limit for the weight design axis (250.00 and 900.00 in the illustrated example). An enable variable font distribution setting 1304 (e.g., a toggle) allows user input specifying between enabling variable font distribution (as illustrated in the example) or disabling variable font distribution. The automatic font value distribution system 106 distributes font values across a collection of glyphs as discussed herein in response to variable font distribution being enabled. An axis setting 1306 allows user input specifying a single design axis value for the collection of glyphs in response to variable font distribution being disabled.

A custom axis range setting 1308 allows user input specifying lower and upper value limits that the automatic font value distribution system 106 is to use for the design axis (400 and 900 in the illustrated example). These lower and upper value limits are restricted to being no smaller than the smallest lower value limit and no larger than the largest upper value limit. An enable font distribution in words setting 1310 (e.g., a toggle) allows user input specifying whether variable font values are to be distributed between the upper value limit and the lower value limit on a per-line basis (as illustrated in the example) or a per-word basis. A distribution profile setting 1312 allows user input specifying the distribution profile that the automatic font value distribution system 106 is to use for the design axis. Nine distribution profiles are illustrated, including no distribution (profile 1314), increasing left to right (profile 1316), decreasing left to right (profile 1318), increasing top to bottom (profile 1320), decreasing top to bottom (profile 1322), increasing diagonally top left to bottom right (profile 1324), decreasing diagonally top left to bottom right (profile 1326), increasing diagonally lower left to top right (profile 1328) and decreasing diagonally lower left to top right (profile 1330). A preview 1332 of a collection of glyphs having the user selected settings is also displayed. In the illustrated example, the design axis is for the weight characteristic and the distribution profile is increasing top to bottom (profile 1320).

Example System and Device

Figure 14:
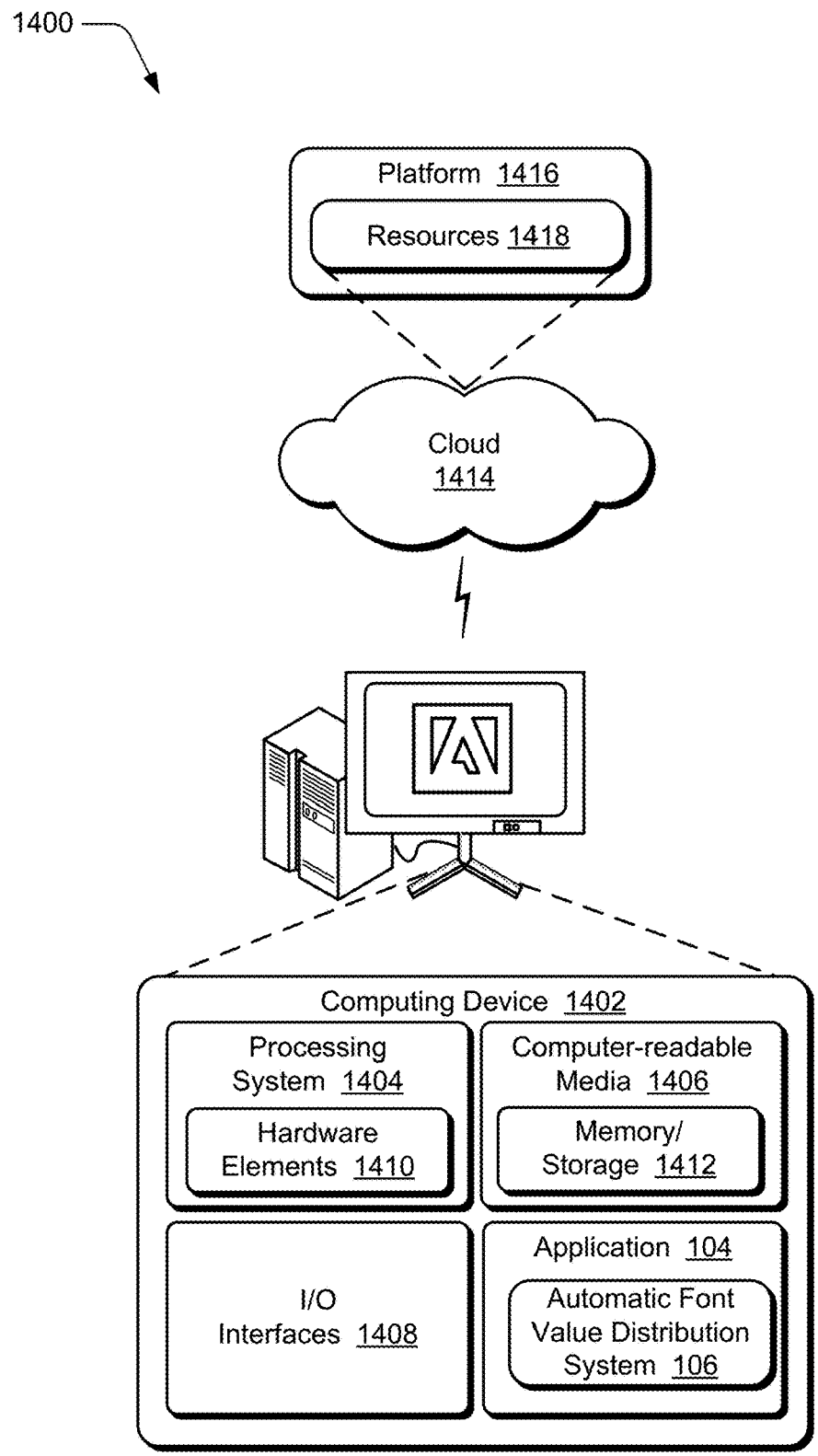
FIG. 14 illustrates an example computing device that is representative of one or more computing systems and/or devices that implement the various techniques described herein.

FIG. 14 illustrates an example system generally at 1400 that includes an example computing device 1402 that is representative of one or more computing systems and/or devices that implement the various techniques described herein. This is illustrated through inclusion of the application 104 with the automatic font value distribution system 106. The computing device 1402 is, for example, a server of a service provider, a device associated with a client (e.g., a client device), an on-chip system, and/or any other suitable computing device or computing system.

The example computing device 1402 as illustrated includes a processing system 1404, one or more computer-readable media 1406, and one or more I/O interface 1408 that are communicatively coupled, one to another. Although not shown, in one or more implementations the computing device 1402 further includes a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware element 1410 that are configured, for example, as processors, functional blocks, and so forth. The processing system 1404 is optionally implemented in hardware as an application specific integrated circuit or other logic device formed using one or more semiconductors. The hardware elements 1410 are not limited by the materials from which they are formed, or the processing mechanisms employed therein. For example, in one or more implementations processors are comprised of semiconductor(s) and/or transistors (e.g., electronic integrated circuits (ICs)). In such a context, processor-executable instructions include electronically-executable instructions.

The computer-readable storage media 1406 is illustrated as including memory/storage 1412. The memory/storage 1412 represents memory/storage capacity associated with one or more computer-readable media. The memory/storage component 1412 represents memory/storage capacity associated with one or more computer-readable media. The memory/storage component 512 includes one or both of volatile media (such as random access memory (RAM)) and nonvolatile media (such as read only memory (ROM), Flash memory, optical disks, magnetic disks, and so forth). The memory/storage component 1412 includes one or both of fixed media (e.g., RAM, ROM, a fixed hard drive, and so on) and removable media (e.g., Flash memory, a removable hard drive, an optical disc, and so forth). The computer-readable media 1406 is optionally configured in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1402 is configured in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

An implementation of the described modules and techniques is optionally stored on or transmitted across some form of computer-readable media. The computer-readable media includes any of a variety of media that is accessible by the computing device 1402. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Computer-readable storage media is non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which is accessed by a computer.

"Computer-readable signal media" refers to a signal-bearing medium that is configured to transmit instructions to the hardware of the computing device 1402, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1410 and computer-readable media 1406 are representative of modules, programmable device logic and/or fixed device logic implemented in a hardware form that are employed in some implementations to implement at least some aspects of the techniques described herein, such as to perform one or more instructions. Hardware includes, for example, components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are optionally employed to implement various techniques described herein. Accordingly, in one or more implementations software, hardware, or executable modules are implemented as one or more instructions and/or logic embodied on some form of computer-readable storage media and/or by one or more hardware elements 1410. The computing device 1402 is configured to implement particular instructions and/or functions corresponding to the software and/or hardware modules. Accordingly, implementation of a module that is executable by the computing device 1402 as software is achievable at least partially in hardware, e.g., through use of computer-readable storage media and/or hardware elements 1410 of the processing system 1404. The instructions and/or functions executable/operable by one or more articles of manufacture (for example, one or more computing devices 1402 and/or processing systems 1404) to implement techniques, modules, and examples described herein.

The techniques described herein are supported by various configurations of the computing device 1402 and are not limited to the specific examples of the techniques described herein. Additionally or alternatively, this functionality is implemented all or in part through use of a distributed system, such as over a "cloud" 1414 via a platform 1416 as described below.

The cloud 1414 includes and/or is representative of a platform 1416 for resources 1418. The platform 1416 abstracts underlying functionality of hardware (e.g., servers) and software resources of the cloud 1414. The resources 1418 include applications and/or data utilizable while computer processing is executed on servers that are remote from the computing device 1402. Resources 1418 optionally include services provided over the Internet and/or through a subscriber network, such as a cellular or Wi-Fi network.

The platform 1416 abstract resources and functions to connect the computing device 1402 with other computing devices. The platform 1416 also optionally serves to abstract scaling of resources to provide a corresponding level of scale to encountered demand for the resources 1418 that are implemented via the platform 1416. Accordingly, in an interconnected device embodiment, implementation of functionality described herein is distributed throughout the system 1400. For example, the functionality is implemented in part on the computing device 1402 as well as via the platform 1416 that abstracts the functionality of the cloud 1414.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment, a method implemented by at least one computing device, the method comprising:
displaying a user interface prompting for user input specifying parameters for a variable font allowing one or more characteristics of the variable font to change along a design axis;
receiving user input specifying the parameters for the variable font, the parameters including an upper value limit for the design axis, a lower value limit for the design axis, a distribution profile indicating a horizontal direction for a display area in which design axis values are to change for the design axis;
receiving user input specifying a collection of glyphs to be displayed in one or more lines of text in the display area according to the parameters for the variable font;
receiving user input indicating a setting to keep the design axis values equal for each respective word in the collection of glyphs;
automatically generating the design axis values along the design axis for each glyph in the collection of glyphs in accordance with the distribution profile by determining a horizontal step value that indicates an amount that the design axis values change between each pair of proximate words in a line of text to be displayed in the display area based on a difference between the upper value limit and the lower value limit and a number of words included in the line of text, the design axis values in the line of text ranging between the lower value limit and the upper value limit with the design axis values for each subsequent word in the line of text changing by the amount indicated by the horizontal step value; and
displaying, in the display area, each glyph in the collection of glyphs with a characteristic corresponding to the automatically generated design axis value for the glyph.

2. The method of claim 1, the design axis comprising one or more of weight, width, slant, optical size, and italic.

3. The method of claim 1, the automatically generating comprising identifying a different design axis value ranging between the lower value limit and the upper value limit for each word in the line of text to be displayed in the display area, the design axis values identified for the words in the line of text being approximately uniformly distributed in accordance with the horizontal step value between the upper value limit and the lower value limit in the horizontal direction.

4. The method of claim 1, the distribution profile indicating a vertical direction for the display area, and the automatically generating comprising determining a vertical step value indicating an amount that the design axis values change between each line of text to be displayed in the display area based on a difference between the upper value limit and the lower value limit and a number of the one or more lines of text to be displayed in the display area.

5. The method of claim 4, the distribution profile indicating the horizontal direction and the vertical direction for the display area, and the automatically generating comprising:
   identifying a different design axis value ranging between the lower value limit and the upper value limit for a beginning word in each line of multiple lines of text to be displayed in the display area, the design axis values identified for the beginning words being approximately uniformly distributed in accordance with the vertical step value between the upper value limit and the lower value limit in the vertical direction; and
   for each of the multiple lines of text, identifying a different design axis value for each word in the line of text ranging between a design axis value identified for the beginning word in the line of text and the lower value limit or the upper value limit, the design axis values identified for the words in the line of text being approximately uniformly distributed between the design axis value identified for the beginning word in the line of text and the lower value limit or the upper value limit in the horizontal direction.

6. The method of claim 1, further comprising substituting one glyph in the collection of glyphs to be displayed in the display area with a replacement glyph, the replacement glyph having a same design axis value as the one glyph but a different width than the one glyph.

7. The method of claim 1, wherein receiving user input specifying the distribution profile includes receiving user input identifying a gradient indicating the horizontal direction.

8. The method of claim 7, wherein the distribution profile indicates a first design axis value, a second design axis value, and a third design axis value.

9. The method of claim 8, the automatically generating comprising identifying a different design axis value ranging between the first design axis value and the second design axis value for each word in a first portion of the line of text, the design axis values identified for the words in the first portion of the line of text being approximately uniformly distributed between the first design axis value and the second design axis value.

10. The method of claim 9, the automatically generating comprising identifying a different design axis value ranging between the second design axis value and the third design axis value for each word in a second portion of the line of text, the design axis values identified for the words in the second portion of the line of text being approximately uniformly distributed between the second design axis value and the third design axis value.

11. The method of claim 1, the displaying further comprising displaying each glyph in the collection of glyphs together in one or more horizontal lines of text in the display area with the design axis values for the words in each line of text changing from the lower value limit to the upper value limit in the horizontal direction indicated by the distribution profile.

12. The method of claim 1, wherein the user interface includes multiple different font characteristics for the variable font, each respective font characteristic including a first user interface element for selecting the respective font characteristic, a second user interface element for specifying the lower value limit associated with the respective font characteristic, and a third user interface element for specifying the upper value limit associated with the respective font characteristic.

13. The method of claim 1, the automatically generating including determining an additional horizontal step value for a different line of text of the one or more lines of text, the additional horizontal step value being different than the horizontal step value based on the line of text and the different line of text including different numbers of words.

14. In a digital medium environment, a computing device comprising:
   a processor; and
   computer-readable storage media storing multiple instructions of an application that, responsive to execution by the processor, cause the processor to perform operations including:
      displaying a user interface prompting for user input specifying parameters for a variable font allowing one or more characteristics of the variable font to change along a design axis;
      receiving user input specifying the parameters for the variable font, the parameters including an upper value limit for the design axis, a lower value limit for the design axis, and a distribution profile indicating a vertical direction for a display area in which design axis values are to change for the design axis;
      receiving user input specifying a collection of glyphs to be displayed in multiple lines of text in the display area according to the parameters for the variable font;
      automatically generating the design axis values along the design axis for each glyph in the collection of glyphs in accordance with the distribution profile by determining a vertical step value that indicates an amount that the design axis values change between each line of text to be displayed in the display area based on a difference between the upper value limit and the lower value limit and a number of the multiple lines of text to be displayed in the display area, the design axis values for each line of text ranging between the lower value limit and the upper value limit with the design axis values for each subsequent line of text changing by the amount indicated by the vertical step value, the glyphs in a respective line of text each having a same design axis value; and
      displaying, in the display area, each glyph in the collection of glyphs with a characteristic corresponding to the automatically generated design axis value for the glyph.

15. The computing device of claim 14, the automatically generating comprising identifying a different design axis value ranging between the lower value limit and the upper value limit for each line of text to be displayed in the display area.

16. The computing device of claim 14, receiving user input specifying the distribution profile includes receiving user input identifying a gradient, the gradient identifying the vertical direction.

17. A system comprising:
   a user interface module, implemented at least in part in hardware, to display a user interface prompting for user input specifying parameters for a variable font allowing one or more characteristics of the variable font to change along a design axis, to receive user input specifying the parameters for the variable font, the parameters including an upper value limit for the design axis, a lower value limit for the design axis, and a distribution profile indicating a horizontal direction for a display area in which design axis values are to change for the design axis, to receive user input specifying a collection of glyphs to be displayed in one or more lines of text in the display area according to the parameters for the variable font, and to receive user input indicating a setting to keep the design axis values equal for each respective word in the collection of glyphs;

means for, implemented at least in part in hardware, automatically generating the design axis values along the design axis for each glyph in the collection of glyphs in accordance with the distribution profile by determining a horizontal step value that indicates an amount that the design axis values change between each pair of proximate words in a line of text to be displayed in the display area based on a difference between the upper value limit and the lower value limit and a number of words included in the line of text, the design axis values in the line of text being approximately uniformly distributed between the lower value limit and the upper value limit with the design axis values for each subsequent word in the line of text changing by the amount indicated by the horizontal step value; and a display module, implemented at least in part in hardware, to display, in the display area, each glyph in the collection of glyphs with a characteristic corresponding to the automatically generated design axis value for the glyph.

18. The system of claim 17, wherein to receive user input specifying the distribution profile, the user interface module is configured to receive user input identifying a gradient, the gradient indicating the horizontal direction.

19. The system of claim 17, the distribution profile indicating a vertical direction in the display area, and means for automatically generating comprising means for determining a vertical step value indicating an amount that the design axis values change between each line of text to be displayed in the display area based on a difference between the upper value limit and the lower value limit and a number of the one or more lines of text to be displayed in the display area.

20. The system of claim 19, the distribution profile indicating the horizontal direction and the vertical direction for the display area, and the means for automatically generating comprising:

means for identifying a different design axis value ranging between the lower value limit and the upper value limit for a beginning word in each of multiple lines of text to be displayed in the display area, the design axis values identified for the beginning words being approximately uniformly distributed in accordance with the vertical step value between the upper value limit and the lower value limit in the vertical direction; and means for identifying, for each of the multiple lines of text, a different design axis value for each word in the line of text ranging between a design axis value identified for the beginning word in the line of text and the lower value limit or the upper value limit, the design axis values identified for the words in the line of text being approximately uniformly distributed between the design axis value identified for the beginning word in the line of text and the lower value limit or the upper value limit in the horizontal direction.

\* \* \* \* \*